(12) United States Patent
Lopez et al.

(10) Patent No.: US 12,467,833 B2
(45) Date of Patent: Nov. 11, 2025

(54) SAMPLING AND TESTING PROCESS FLUIDS FROM A LITHIUM RECOVERY SYSTEM AND ASSOCIATING PROCESS DATA AND TEST DATA OF THE PROCESS FLUID SAMPLES

(71) Applicant: Schlumberger Technology Corporation, Sugar Land, TX (US)

(72) Inventors: Miguel Angel Lopez, Sugar Land, TX (US); Rod William Shampine, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 302 days.

(21) Appl. No.: 18/333,651

(22) Filed: Jun. 13, 2023

(65) Prior Publication Data

US 2023/0400390 A1  Dec. 14, 2023

Related U.S. Application Data

(60) Provisional application No. 63/366,260, filed on Jun. 13, 2022.

(51) Int. Cl.
*G01N 1/20* (2006.01)
*G01N 1/18* (2006.01)

(52) U.S. Cl.
CPC ............. *G01N 1/2035* (2013.01); *G01N 1/18* (2013.01); *G01N 2001/2057* (2013.01)

(58) Field of Classification Search
CPC . C22B 26/12; C22B 3/42; G01N 1/18; G01N 1/2035; G01N 2001/2057; G01N 2035/00831; G01N 2035/00881; G01N 35/00722; G01N 35/00871; G01N 35/00732; G01N 2035/00742; G01N 2035/00752; G01N 2035/00841; C01D 15/00

(Continued)

(56) References Cited

U.S. PATENT DOCUMENTS

2019/0234974 A1 * 8/2019 Wiederin .......... G01N 35/00732
2019/0256368 A1 * 8/2019 Marston ............. B01D 15/1807

(Continued)

FOREIGN PATENT DOCUMENTS

WO    2023009888 A1    2/2023

*Primary Examiner* — Kristina M Deherrera
*Assistant Examiner* — Truong D Phan
(74) *Attorney, Agent, or Firm* — Jeffrey D. Frantz

(57) ABSTRACT

A fluid sampling system having a nozzle, a fluid path configured to transfer a process fluid sample of a process fluid from a process fluid source of a lithium recovery system to the nozzle, a fluid control device along the fluid path, an identification tag reader, and a processing device. The fluid control device may operate between a closed position in which it prevents transfer of the process fluid sample and an open position in which it permits transfer of the process fluid sample into a sample container. The identification tag reader may read an identification tag associated with the sample container and output dispenser identification tag data indicative of the identification tag. The processing device may receive process sensor data indicative of properties of the process fluid, receive the dispenser identification tag data, and associate the dispenser identification tag data with the process sensor data.

20 Claims, 8 Drawing Sheets

(58) Field of Classification Search
USPC .................................................... 73/863.86
See application file for complete search history.

(56) References Cited

U.S. PATENT DOCUMENTS

2022/0055910 A1     2/2022  Jariwala
2022/0212144 A1*    7/2022  Burba .................. B01J 20/0281
2023/0357942 A1    11/2023  Perroni

* cited by examiner

SAMPLING AND TESTING PROCESS FLUIDS FROM A LITHIUM RECOVERY SYSTEM AND ASSOCIATING PROCESS DATA AND TEST DATA OF THE PROCESS FLUID SAMPLES

CROSS-REFERENCE TO RELATED APPLICATIONS

This application claims priority to and the benefit of U.S. Provisional Patent Application No. 63/366,260, entitled "SAMPLING AND TESTING PROCESS FLUIDS FROM A LITHIUM RECOVERY SYSTEM AND ASSOCIATING PROCESS DATA AND TEST DATA OF THE PROCESS FLUID SAMPLES," filed Jun. 13, 2022, the entire disclosure of which is hereby incorporated herein by reference.

BACKGROUND OF THE DISCLOSURE

Lithium is a vital element in energy storage. Electrical storage devices, such as batteries, supercapacitors, and other devices commonly use lithium to mediate the storage and release of chemical potential energy as electrical current. As demand for renewable, but non-transportable energy sources, such as solar and wind energy grows, demand for technologies to store energy generated using such sources also grows.

According to the United States Geological Survey, global reserves of lithium total 21 million tons (metric) of lithium content, with Chile, Australia, Argentina, and China accounting for about 82% of global reserves. U.S. Geological Survey, Mineral Commodity Summaries, January 2021. Global production of lithium content was 82 kT in 2020 and 86 kT in 2019. Global consumption was estimated at 56 kT in both 2019 and 2020. By one estimate, global lithium demand is expected to reach 1.79 MTa of lithium carbonate equivalent, which is approximately 339 kTa of lithium content, by 2030 for an average annual growth in demand of approximately 22%. Supply is currently forecast to run behind demand, with lithium prices expected to triple by 2025, according to some estimates. The incentive for more lithium production could not be clearer.

The mining industry has numerous techniques for the extraction of lithium from mineral or saline waters. Hard rock mining with acid digestion is common, but labor intensive. Methods currently used for salar lakes involve evaporation ponds with chemical additives to selectively precipitate the lithium. This process can take months to complete, recovering roughly 50-60% of the original lithium.

Lithium can be extracted from aqueous fluid sources, such as salar lakes, surface brines, seawater, petro-lithium brine, mining brines (e.g., lithium-containing shale or mica, spodumene, etc.), geothermal brines, battery recycling effluent, and other aqueous lithium sources. Lithium minerals, such as lithium-bearing clays (e.g., hectorite), can also be dispersed in water for processing lithium extraction processes. More generally, any aqueous fluid containing lithium may be processed by the systems and/or methods described in the current disclosure. In recent years, companies are investigating improved methods to recover lithium directly from salar lakes and other brine sources that avoid evaporation, are faster, and have high lithium yield.

Lithium processing plants incorporate processes that manipulate the chemical properties of an aqueous fluid containing lithium as the aqueous fluid flows through different areas of the plant. Adsorbents can be used to selectively recover the lithium, followed by a wash step that liberates the lithium for further processing. However, adsorbents can be sensitive to impurities, such as divalent ions, silica, and metals.

Inline sensors at different locations of a lithium processing plant measure various properties (e.g., flow rate, temperature, pressure, etc.) of the aqueous fluid, as the aqueous fluid flows through the plant and is being processed. The measurements can be acquired to produce time series data that can be analyzed in real time or later. Other properties (e.g., chemical composition) of the aqueous fluid can be determined by collecting samples of the aqueous fluid at various plant locations and then taking the samples into a lab for analysis with specialized test machines. However, the manual procedure (or process) of collecting the sample, labelling the sample with meaningful contextual data (e.g., sample location, sample time, step of the chemical process, etc.), testing the sample, and entering the data into the time series database to correlate to the process sensor data can be very cumbersome and time consuming. Also, solid particles suspended within certain aqueous fluids, such as slurries, can clog and restrict flow of the aqueous fluid through fluid control valves (e.g., flow rate control valves, flow shut-off valves, etc.) while collecting the aqueous fluid samples. Such clogging problem can cause inaccurate volume measurements of the aqueous fluid samples, thereby causing inaccuracies in sample analysis.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system that includes a lithium recovery system and sensors each operable to output a sensor data indicative of a property of a process fluid at a process fluid source of the lithium recovery system. The system also includes sample dispensers, fluid conduits each fluidly connecting an instance of the sample dispensers and a corresponding process fluid source, and sample containers. Each sample dispenser is operable to dispense a process fluid sample from a corresponding process fluid source into an instance of the sample containers disposed in association with that sample dispenser. The system also includes identification tags, each associated with a corresponding instance of the sample containers, and dispenser identification tag readers each associated with a corresponding instance of the sample dispensers. Each dispenser identification tag reader is operable to: read the identification tag associated with an instance of the sample containers disposed in association with the sample dispenser associated with that dispenser identification tag reader; and output dispenser identification tag data indicative of that identification tag. The system also includes a sample tester operable to: determine a property of the process fluid sample within an instance of the sample containers; and output sample test data indicative of the property of the process fluid sample. The system also includes a tester identification tag reader associated with the sample tester and operable to: read the identification tag associated with an instance of the sample containers containing the process fluid sample that is intended to be tested by the sample tester; and output tester identification tag data indicative of that identification tag. The system also includes a processing device operable to:

receive the sensor data output by each sensor; receive the dispenser identification tag data output by each dispenser identification tag reader; associate the dispenser identification tag data output by each dispenser identification tag reader with the sensor data indicative of the properties of the process fluid at an instance of the process fluid sources corresponding to an instance of the sample dispensers associated with that dispenser identification tag reader; receive the tester identification tag data output by the tester identification tag reader; receive the sample test data output by the sample tester; compare the tester identification tag data output by the tester identification tag reader to the dispenser identification tag data output by each dispenser identification tag reader; and associate the sample test data with the sensor data associated with the dispenser identification tag data that matches the tester identification tag data.

The present disclosure also introduces a method that includes dispensing, by sample dispensers, process fluid samples of process fluids from process fluid sources of a lithium recovery system into sample containers. Each instance of the process fluid sources is associated with a corresponding instance of the sample dispensers. Each instance of the sample containers carries a corresponding identification tag. Each instance of dispenser identification tag readers reads an instance of the identification tags carried by a corresponding instance of the sample containers. Each instance of the dispenser identification tag readers is associated with a corresponding instance of the sample dispensers and thus associated with a corresponding instance of the process fluid sources. Each instance of the dispenser identification tag readers outputs dispenser identification tag data indicative of the identification tag being read by that instance of the dispenser identification tag readers. A sample tester tests each instance of the process fluid samples to determine a property of each instance of the process fluid samples. The sample tester outputs a sample test data indicative of the property of each instance of the process fluid samples. A tester identification tag reader reads each identification tag. The tester identification tag reader outputs a tester identification tag data indicative of each identification tag. Each of multiple sensors outputs sensor data indicative of a property of an instance of the process fluids. Each instance of the sensors is associated with a corresponding instance of the process fluid sources. A processing device associates each instance of the sensor data with a corresponding instance of the dispenser identification tag data. The instance of the sensors outputting the instance of the sensor data and the instance of the dispenser identification tag readers outputting the corresponding instance of the dispenser identification tag data are associated with the same instance of the process fluid sources. The processing device compares each instance of the tester identification tag data output by the tester identification tag reader to each instance of the dispenser identification tag data output by each instance of the dispenser identification tag readers. For each instance of the tester identification tag data and each instance of the dispenser identification tag data that match, the processing device associates each instance of the sample test data with a corresponding instance of the sensor data.

The present disclosure also introduces a system that includes a fluid sampling system including a fluid nozzle, a fluid path that transfers a process fluid sample of a process fluid from a process fluid source of a lithium recovery system to the fluid nozzle, and a fluid control device along the fluid path. The fluid control device is operable between a closed position, in which the fluid control device prevents transfer of the process fluid sample through the fluid path to the fluid nozzle, and an open position, in which the fluid control device permits transfer of the process fluid sample through the fluid path to the fluid nozzle and into a sample container disposed in association with the fluid nozzle. The system also includes an identification tag reader operable to: read an identification tag associated with the sample container disposed in association with the fluid nozzle; and output dispenser identification tag data indicative of the identification tag. The system also includes a processing device operable to: receive process sensor data indicative of properties of the process fluid at the process fluid source of the lithium recovery system; receive the dispenser identification tag data output by the dispenser identification tag reader; and associate the dispenser identification tag data with the process sensor data.

The present disclosure also introduces a system that includes a fluid sampling system including a first fluid path fluidly connected to a process fluid source of a lithium recovery system, a second fluid path fluidly connected with the first fluid path, a third fluid path fluidly connected with the first fluid and second fluid paths, a first fluid control device along the first fluid path, a second fluid control device along the second fluid path, and a third fluid control device along the third fluid path. The first fluid path transfers a process fluid from the process fluid source. The third fluid path transfers the process fluid into a sample container disposed in association with an end of the third fluid path. The first fluid control device is operable between a closed position, in which the first fluid control device prevents flow of the process fluid through the first fluid path, and an open position, in which the first fluid control device permits flow of the process fluid through the first fluid path. The second fluid control device is operable between a closed position, in which the second fluid control device prevents flow of the process fluid through the second fluid path, and an open position, in which the second fluid control device permits flow of the process fluid through the second fluid path. The third fluid control device is operable between a closed position, in which the third fluid control device prevents flow of the process fluid through the third fluid path, and an open position, in which the third fluid control device permits flow of the process fluid through the third fluid path. A portion of the second and/or third fluid path extending between the second and third fluid control devices define a fluid chamber having a predetermined volume for containing a process fluid sample of the process fluid. When the first and second fluid control valves are in the open positions and the third fluid control valve is in the closed position, the process fluid is permitted to flow through the first and second fluid paths to fill the fluid chamber with the process fluid sample and the process fluid is prevented from flowing through the third path into the sample container. When the first and second fluid control valves are in the closed positions and the third fluid control valve is in the open position, the process fluid is prevented from flowing through the first fluid path and the process fluid sample is permitted to flow from the fluid chamber through the third path into the sample container.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure may be understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
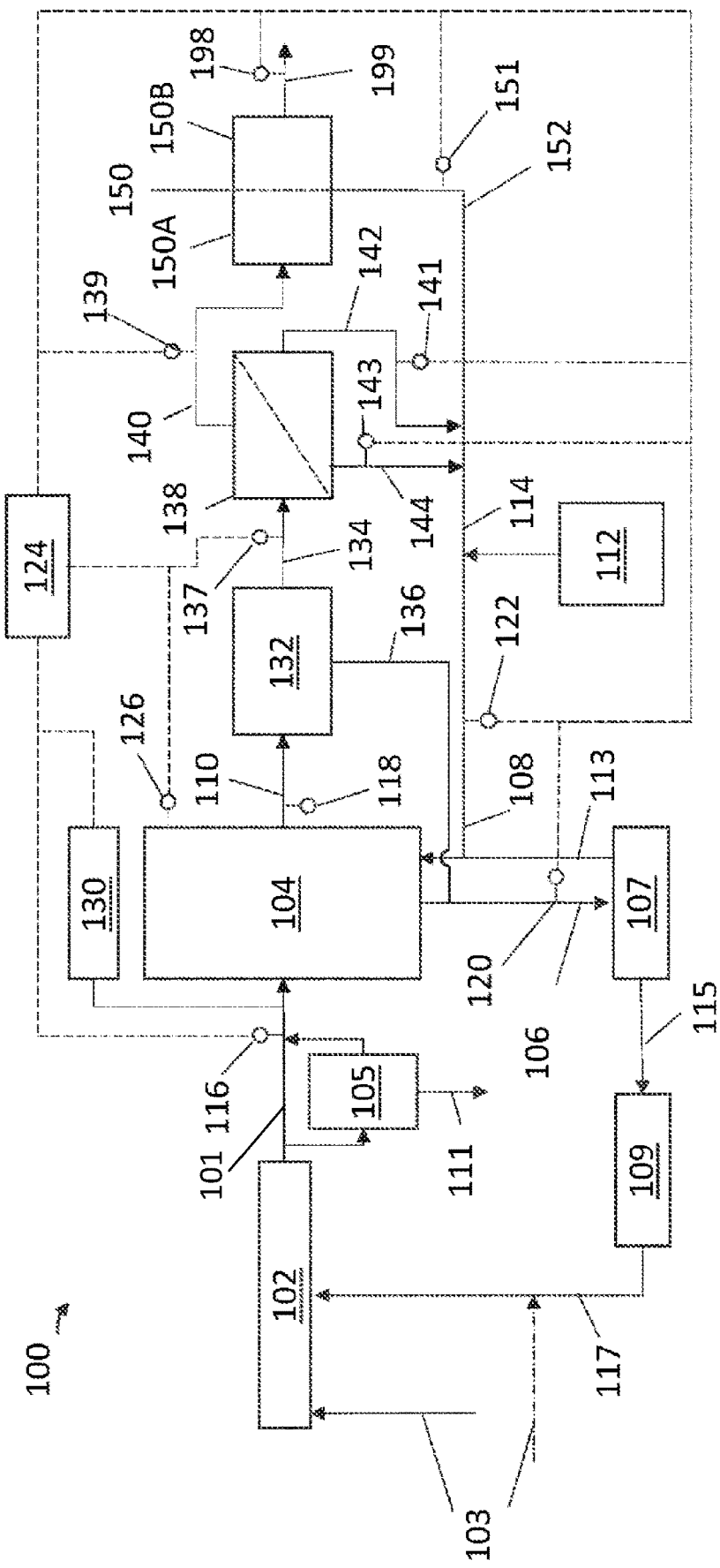
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows, may include embodiments in which the first and second features are formed in direct contact, and may also include embodiments in which additional features may be formed interposing the first and second features, such that the first and second features may not be in direct contact.

FIG. 1 is a schematic view of at least a portion of a lithium recovery system 100 according to one or more aspects of the present disclosure. The lithium recovery system 100 may use an ion withdrawal process, in the example described herein a sorption/desorption process, to extract lithium from a brine along with a concentration process, for instance membrane concentration process, to increase solution concentration of lithium for downstream conversions to lithium carbonate and/or lithium hydroxide hydrate. The sorption portion of the process may be absorption or adsorption, or a mixture thereof, depending on the medium used to accomplish the sorption.

A lithium-containing brine stream 101 from a brine source 102 may be brought to the inlet of a lithium extractor 104. The lithium extractor 104 may be a sorption unit, with a sorption medium that selectively absorbs lithium. In the lithium extractor 104 may be or comprise a resin disposed within a vessel to provide exposure of the resin to a lithium-containing brine. The resin may be stationary or fluidized within the vessel, or the resin may be conveyed through one or more vessels or zones for contacting with the brine, for example in a counter-current format. The resin adsorbs lithium from the brine source 102, thereby leaving a lithium-depleted brine 106, which exits the lithium extractor 104. Adsorption may be encouraged by heating the brine source 102 to a brine source temperature of 70 degrees Fahrenheit (° F.) to 90° F., where the brine source 102 may have a natural temperature that is below that range. Water may be separated from the lithium-depleted brine 106 using a water recovery process 107, which may be a filtration or membrane process. The water recovery process recovers a water stream 113 from the lithium-depleted brine 106, yielding an impurity stream 115. The water stream 113 may be re-used in the lithium extractor 104, as further described below, and the impurity stream 115 routed to a purification process 109, which may be a suitable purification process, such as a rapid infiltration process, or other filtration or membrane process, or combination of processes, before a clean brine 117 is returned to the environment.

Lithium recovery processing may be enhanced by lowering the acidity level (pH) in the brine source 102. A lithium-selective additive sweep 103 may be applied directly to the brine source 102 to encourage lithium to migrate toward the feed of the lithium extractor 104. For example, where the brine source contains lithium chloride, a sweep 103 of hydrochloric acid (HCl) may be injected in the brine source 102 at a location remote from the feed to the lithium extractor 104 to enhance lithium recovery processing. Applying an acid sweep such that the pH of the feed to the lithium extractor 104 ranges between about 5.5 and 7.0, for example about 6.0, can, for example, mobilize lithium from mineral deposits in and around the brine source. A low pH in the brine source 102 may be remediated after exhaustion of the lithium, when intended, by adding a suitable basic compound, such as sodium or potassium hydroxide to raise the pH to its original value. In one alternate method, the lithium-selective additive sweep 103 may be added to brine returned to the brine source 102 from the lithium recovery system 100, so the returned brine may be used as a vehicle to deliver the sweep 103. Other materials that may be used as lithium-selective additive sweep include lithium-selective absorbents, polymers, dissolved gases, liquid ion-exchange fluids, and other materials. Selection of such materials depend on geometry and composition of the brine source 102 and location of brine withdrawal from, and injection into, the brine source 102.

An optional pretreat process may be performed on the brine from the brine source 102 to reduce impurities that might impact performance of the lithium extractor 104. For example, a compatible reagent may be added to the brine source in a pretreat unit 105 to reduce impurities, such as iron and other metals, prior to exposing the lithium extractor 104 to the brine. The impurities may be removed as an impurity stream 111. Such treatments may be helpful where impurity levels are too high to treat directly at the brine source 102, but removal of at least some impurities would be helpful to initial extraction processing. In another version of a pretreat process, which may be combined with the pretreat process described above, an impurity absorber or filter, or both, may be used to absorb impurities that might affect performance of the lithium extractor 104. A medium selective to such impurities, such as an ion exchange medium or filtration medium, may remove impurities, such as silica and divalent ions, that can degrade lithium sorption of the absorbent of the lithium extractor 104.

In the lithium extractor 104, resin loaded with lithium may be contacted with an eluent stream 108 that removes lithium from the loaded resin. A lithium extract stream 110 may exit the lithium extractor 104. Most non-lithium ions in the original brine stream may exit with the lithium-depleted brine, so the lithium extract stream 110 has, at most, low levels of impurities. The eluent stream 108 may be deionized water, or water with low levels of lithium or other ions. A water source 112, such as a deionized water source or a water purifier, may be used to provide water for the eluent stream 108. Here, a lithium-containing stream 114 may be recycled from downstream operations to provide water for the eluent stream 108. The water stream 113 may also be used to provide water for the eluent stream 108. Water may be added from the water source 112 where make-up water is used to reach a target solution concentration in the lithium extract stream 110, or to lower solution concentration of ions, such as lithium or other ions, to a target level in the eluent stream 108. Using recycled streams for the eluent stream 108 reduces, and may eliminate, the use of fresh water makeup. Lithium desorption may be increased by heating the eluent stream to an eluent temperature of about 100° F. to 140° F.

Composition-related sensors may be coupled to one or more of the incoming and outgoing streams of the lithium extractor 104 to provide data for controlling and optimizing the operation of the lithium extractor 104. The composition sensors may be or comprise pH sensors, conductivity sensors, permittivity sensors, specific gravity sensors, turbidity sensors, electrochemical sensors (e.g., ionophoric electrodes and membranes), chromatographs or other differential separation instruments, spectrometers (FTIR, NMR, flame ionization or emission, mass spectrometers, X-ray fluorescence, etc.) or other optical sensors, and the like. One or more sensors may be used for each stream, and multiple sensors based on different technologies may be used to reduce measurement uncertainty for each stream. Temperature and pressure sensors may also be coupled to an intended stream.

Thus, one or more composition sensors 116 may be disposed at the brine source 102 or at the brine inlet to the lithium extractor 104, one or more lithium extract composition sensors 118 may be disposed in the lithium extract stream 110, one or more lithium-depleted stream sensors 120 may be disposed in the lithium-depleted brine 106, and one or more eluent sensors 122 may be disposed in the eluent stream 108. Each, or any, of the composition sensors 116, 118, 120, and 122 may also sense other conditions of each respective stream, such as temperature and pressure. Each of the sensors 116, 118, 120, and 122, when used, may be operatively coupled to a controller 124 configured to receive signals from each of the sensors 116, 118, 120, and 122 representing composition, and optionally other conditions, of the corresponding streams. Other sensors may optionally be used to sense other conditions of the respective streams, such as temperature and pressure, separately and provide signals representing those other conditions to the controller 124. The controller 124 may be configured to adjust process conditions of the lithium extractor 104 based on the signals from the sensors 116, 118, 120, and 122, and other sensors that may be applied. For example, the controller 124 may adjust flow rate of the brine source 102, flow rate of the eluent stream 108, flow rate of water from the water source 112, and/or flow rate of the lithium-containing stream 114 based on the signals. The controller 124 may also be configured to monitor lithium uptake of the absorbent, for example based on lithium detected in the brine source 102 by the brine source sensor 116 and lithium detected in the lithium-depleted brine 106. The controller 124 may be configured to adjust resin loading time (i.e., time spent loading the resin with lithium), resin cycle time (resin loading time plus resin unloading time), brine residence time, eluent residence time, or other process parameters based on lithium uptake. Lithium unloading may also be similarly monitored, and process adjustments made by the controller 124.

Other sensors may be used with the lithium extractor 104. For example, imaging or "signature" sensors of various types, such as NMR and XRD sensors, may be used and operatively coupled to the controller. Thus, a signature sensor 126 may be coupled to the lithium extractor 104 to generate a signal representing the effect of the lithium extractor on an electric field, magnetic field, or propagating electromagnetic radiation. The signal may be thought of as a signature representative of process conditions. The signature sensor 126, for example, may be operable to highlight more esoteric process conditions, such as channeling, plugging, or scaling in the resin and to signal an operator that such process conditions are occurring. The signature sensors may typically inject some form of electromagnetic radiation into the lithium extractor 104 itself. The radiation interacts with the interior of the lithium extractor 104, and the resulting radiation "signature" may be detected to derive information about the interior of the extractor.

Another example of a sensor system that may be used to track operation and performance of the lithium extractor 104 may be a physical replica of the extractor. An absorber-analyzer 130 may be coupled to the brine source 102 to serve as a test unit to monitor for changing composition of the brine source 102. The absorber-analyzer 130 may be a small sorption unit loaded with the same medium used to absorb lithium in the lithium extractor 104. The absorber-analyzer 130 may be monitored for changing performance to detect changing levels of impurities that may affect performance of the sorption medium in the lithium extractor 104. A slipstream of the brine source 102 may be routed to the absorber-analyzer 130, and sensors, such as pH sensors, conductivity sensors, temperature and pressure sensors, and composition sensors, may be applied to monitor changing conditions within the absorber-analyzer 130 to predict changing conditions of the lithium extractor 104. The sensors, which may include one or more of the sensors mentioned above, may be operatively coupled to the controller 124. The controller 124 may monitor the sensors of the absorber-analyzer 130 and apply predictive methods, such as simulators and machine learning systems, to control the lithium extractor 104 based on the readings from the absorber-analyzer sensors. The sensors coupled to the lithium extractor 104 may also be used.

Another sensor system that may be used to track operation and performance of the lithium extractor 104 may be a tracer detector. An easily detectible species with behavior toward the absorbent medium of the lithium extractor 104 may be injected into the feed to the extractor 104 as a tracer, and detection of the tracer may be applied to one or more of the effluent streams 106 and 110 to monitor uptake of the tracer by the absorbent medium. The same tracer detector system may be applied to the absorber-analyzer, when intended. It should be noted that additional sample streams may be obtained from the lithium extractor 104 and/or the absorber-analyzer 130 to monitor conditions of the absorbent medium at intermediate locations between the feed and the effluent. The tracer detector system may provide analysis of changing conditions throughout the lithium extractor 104 during processing to control the extractor and diagnose intervention situations.

The lithium extract stream 110 may have a solution concentration of lithium limited by solubility of the extracted lithium salt. Flow rate of the eluent stream 108 may be controlled to maximize solution concentration of lithium in the extract stream 110. The lithium extractor 104 may boost lithium solution concentration, in some cases, by a factor of 20 or more. That is to say, a ratio of lithium solution concentration in the lithium extract stream 110 to lithium solution concentration in the brine source 102 may be a factor of 20 or more. Depending on concentration of the brine source 102, the ratio may be almost arbitrarily large. Dilute brine sources will take time to load the absorbent medium in the extractor 104, but when loaded, the lithium may be unloaded at near the solubility limit in the extract stream 110. For example, a brine source containing 10 parts per million (ppm) lithium could be processed using the lithium extractor 104 to yield a lithium extract stream 110 having 40,000 ppm lithium, for a concentration gain ratio of 4,000.

The lithium extract stream 110 may be routed to an impurity removal unit 132, which may be a filtration unit, ion exchange unit, membrane unit, flocculation unit, precipitation unit, electrochemical coagulation unit, density separation unit, or other chemical or physical treatment unit for removing non-lithium impurities, such as silica, other particulates, and divalent metal ions. The impurity removal unit 132 produces a clean lithium extract stream 134, and may produce one or more impurity streams 136 that may be routed to the water recovery process 107, or to another advantageous use. The solution concentration of lithium in the clean lithium extract stream 134 may be the same as that of the lithium extract stream 110, or may be less, when chemical additives are used to remove impurities. When downstream concentrators are used to recover lithium, minimizing dilution during impurity removal may minimize concentrator duty.

A composition sensor 137, optionally also including temperature and pressure sensors, may be coupled to the clean lithium extract stream 134, for example to monitor impurities that might pass through the impurity removal unit 132. Temperature and pressure of the clean lithium extract stream 134 may optionally be sensed separately. The composition sensor 137, and other sensors optionally coupled to the clean lithium extract stream 134, may be operatively connected to the controller 124, which may be configured to control operation of the impurity removal unit 132 based on signals from the composition sensor 137 to target or minimize level of one or more impurities, such as divalent ions.

The clean lithium extract stream 134 may be routed to a concentrator 138. The concentrator 138 may be or comprise a water removal process that produces a lithium concentrate stream 140 and a water stream 142. Here, the concentrator 138 is depicted as a membrane separator, but the concentrator 138 may also or instead be an evaporator, such as a thermal evaporator, a force circulation evaporator (i.e., an evaporator that utilizes humidity of a gas), or a multi-effect evaporator, in some embodiments. The concentrator 138 may also produce a sweep effluent 144 that may be combined with other streams in a controlled fashion to target a salinity level in the eluent stream 108. The water removal process of the concentrator 138 may use multiple membrane separation units and/or multiple evaporators in series and/or parallel. For membrane separation, the lithium extract stream 134 may be brought to a target pressure, for example using a pump. A portion of one or more of the effluent streams of the concentrator 138 (including the lithium concentrate stream 140 and the water stream 142) may be recycled to the lithium extractor 104 as the lithium-containing stream 114, or a component thereof, to be used as part of the eluent stream 108. Salinity in the eluent stream 108 may be controlled by mixing various salt-containing streams, with varying salinities, to meet a target. The concentrator 138 may increase lithium solution concentration by a factor of about 20, in some cases, by removing water from the clean lithium extract stream 134. The permeate stream 142 may be a fresh water stream that is recycled to the lithium extractor 104 in the eluent 108.

The controller 124 may be further configured to operate the impurity removal unit 132 based on signals from the composition sensor 137 to intensify removal of impurities by adjusting temperature, pressure, or sweep to increase separation of impurities. Other effluent streams of the concentrator 138 may also have sensors operatively coupled to the controller 124. A lithium concentrate sensor 139 may be coupled to the lithium concentrate stream 140. A water sensor 141 may be coupled to the water stream 142. Where a sweep is used for a membrane process, a sweep sensor 143 may be coupled to the sweep effluent 144. Each of the sensors 139, 141, and 143 may optionally also include temperature and pressure sensors, or such sensors may be separately coupled to the respective streams. Each of the sensors 139, 141, and 143, when used, may be operatively coupled to the controller 124, which may be configured to adjust operation of the concentrator 138 based on signals from the sensors 139, 141, and 143, and to adjust recycle of streams to the lithium extractor 104 based on the composition signals and/or the condition (pressure, temperature, etc.) signals from the sensors. When lithium penetration occurs in the concentrator 138, the lithium may be recycled in the eluent 108 and recovered in the lithium extractor 104. When increased lithium concentration in the eluent 108 is detected due to lithium penetration in the lithium concentrator 138, the controller 124 may use more make-up water from the water source 112, or more or less of the recycled downstream streams from the concentrator 138 (e.g., the permeate stream 142) or the conversion process 150.

The lithium concentrate stream 140 may be converted to a lithium hydroxide product 199, such as a lithium hydroxide monohydrate, in a conversion process 150. The conversion process 150 involves a first treatment 150A using sodium carbonate to convert lithium chloride to lithium carbonate followed by a second treatment 150B using calcium hydroxide to convert lithium carbonate to lithium hydroxide powder or hydrate paste. Either or both treatments may include evaporation, which encourages precipitation, but may also precipitate some impurities in the first treatment 150A. A wash step may be performed on the filtrate to remove impurities with little loss of lithium. The wash effluent may be returned to the brine source 102. In alternate methods, direct conversion to lithium hydroxide may be accomplished by using electrochemical methods.

The evaporation may produce water streams 152 that may be used for recycling, for example to the eluent stream 108, potentially along with other streams that may be recycled to the lithium extractor 104 to target salinity concentration in the eluent stream 108. Where the water stream 142 of the concentrator 138 is a first water stream, one or more second water streams 152 are produced by the conversion process 150. Examples of other streams from the conversion process 150 that may be recycled include a portion of the lithium carbonate stream from the first treatment 150A and/or a portion of the lithium hydroxide from the second treatment 150B, which may be recycled, with or without other streams from the conversion process 150 or the concentrator 138, to the eluent stream 108. One or more of the clean lithium-containing streams derived from the clean lithium extract stream 134 may be manifolded to the eluent stream 108, with flow controls operatively coupled to the controller 124, which may be configured to adjust flow rates of the various streams, along with make-up water from the water source 112, or water recovered in the water recovery process 107, to optimize composition of the eluent stream 108 for lithium unloading from the absorbent medium. As described above, composition of the various streams may be sensed, and signals routed to the controller 124 to determine an eluent stream composition for optimal unloading rate and lithium solution concentration. A water composition sensor (optionally including temperature and pressure) 151 may be coupled to the water streams 152 to monitor for impurities and/or salt or hydroxide content, and may be operatively coupled to the controller 124, which may be further configured to control recycle rate of the water stream 152 to target composition of the eluent stream 108 based further on signals from the water composition sensor 151. A product sensor 198 may be coupled to the lithium hydroxide product 199 to monitor for impurities, and may be operatively coupled to the controller 124, which may be further configured to control impurity removal at the brine source 102, the pretreat 105, or the impurity removal process 132 based on signals from the product sensor 198.

Evaporation in the conversion process 150 may be reduced by using membrane separation to remove some water prior to evaporation steps. For example, after converting the lithium to lithium hydroxide, the lithium hydroxide stream may be heated to about 200° F. to 210° F. to maximize solubility of lithium hydroxide. The heated lithium hydroxide stream may then be subjected to membrane separation to remove water as a permeate stream. The non-permeate stream, concentrated in lithium hydroxide, may then be cooled to encourage lithium hydroxide to precipitate, and the precipitated solid may be recovered and dried with reduced energy input.

The use of an impurity removal process following lithium extraction provides various lithium-containing water streams that may be used in the eluent stream 108 for lithium extraction. The use of such streams recycles those streams through the impurity removal process further cleaning the downstream process and routing the impurities, most of which come from the brine source 102, to the lithium-depleted brine 106 or back to the brine source 102. These recycle streams may also help optimize the use of water, putting clean brine streams produced by the various processes downstream of the impurity removal process to use as carrier streams to reduce the use of fresh water.

Figure 2:
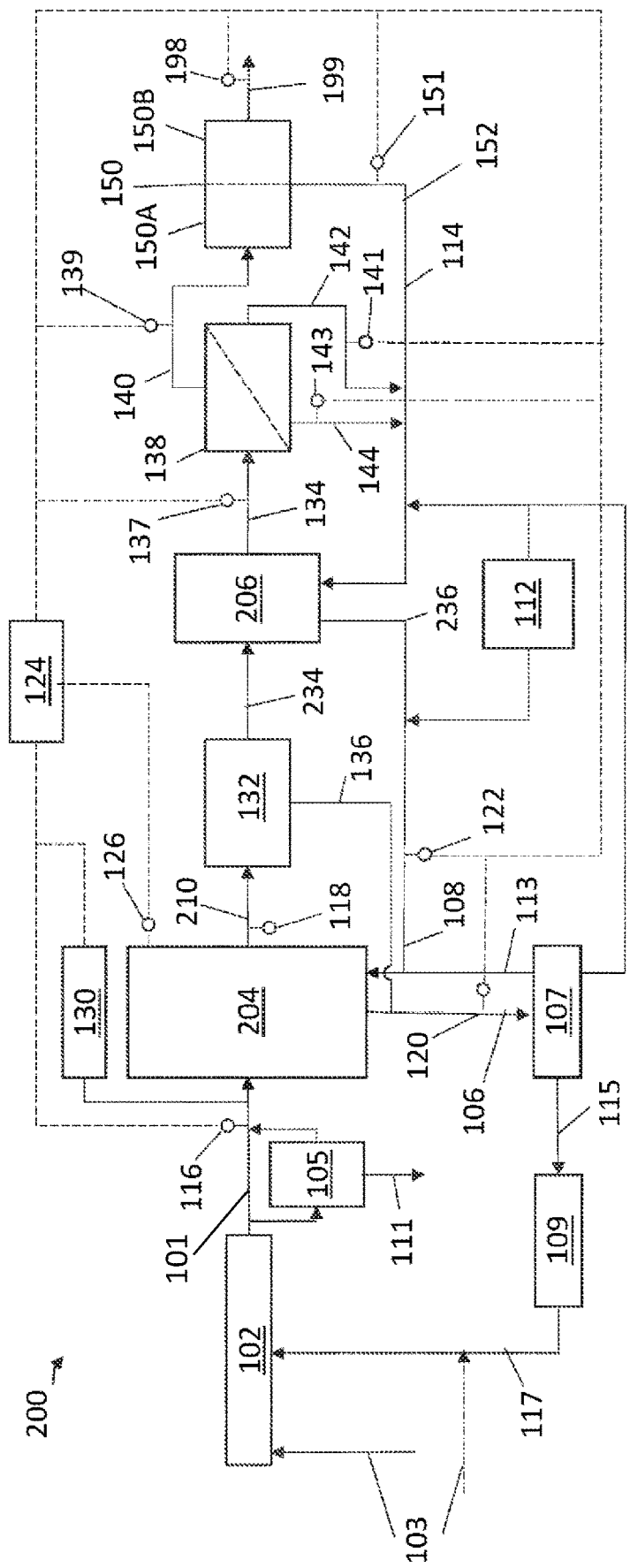
FIG. 2 is a schematic view of at least a portion of an example implementation of apparatus according to one or more aspects of the present disclosure.

FIG. 2 is a schematic view of at least a portion of a lithium recovery system 200 according to one or more aspects of the present disclosure. The lithium recovery system 200 of FIG. 2 may be similar to the lithium recovery system 100 of FIG. 1 in some respects, and elements of the lithium recovery system 200 that are the same as elements of the lithium recovery system 100 are labeled using the same numerals. In the lithium recovery system 200, two lithium extractors are used instead of one. For example, a first lithium extractor 204 performs a first lithium extraction process, similarly as described above, but to an intermediate lithium concentration to form an intermediate lithium extract stream 210. The intermediate lithium extract stream 210 may be routed to the impurity removal unit 132, which yields a clean intermediate lithium extract stream 234.

The stream 234 may be routed to a second lithium extractor 206 for concentration to an arbitrary solution concentration of lithium, for example near the solubility limit of lithium chloride, to form the clean lithium extract stream 134. In this case, the lithium-depleted brine 106 may be a first lithium-depleted brine 106, and the second lithium concentrator 206 may produce a second lithium-depleted brine 236 that may be recycled to the first lithium extractor 204 for use in the eluent stream 108. Similarly as described above, the first lithium extractor 204 may also use make-up water from the water source 112 for the eluent stream 108. The second lithium extractor 206 may also use make-up water from the water source 112 or the water recovery 107 as eluent, but may also use recycled water and lithium-containing streams from the downstream concentrator 138 and conversion process 150.

Separating lithium extraction into two stages, with impurity removal between the two stages, permits the second lithium extractor 206 to serve also as a final stage of impurity removal. The intermediate stream 234 may have a low level of impurities that are not removed by the impurity removal unit 132, but the selectivity of the resin in the second lithium extractor 206 may result in very low levels of impurities, if any, being passed through to the clean stream 134. The use of two extraction stages 204 and 206 may also be more effective in preventing downstream transfer of impurities, because impurities that pass through the first extraction stage 204 may be partially or completely removed by the second extraction stage 206. The capacity of the first lithium extractor 204 may also be lower because the total lithium uptake capacity used is now split between the two extractors 204 and 206. Depending on the brine source used for the lithium recovery system 200, splitting lithium extraction into two stages, with impurity removal between the two stages, may lower the overall capital investment and operating cost to accomplish the lithium recovery.

The composition sensor 137 may be used similarly here by the controller 124, which may be configured to control the impurity removal unit 132 and distribute the lithium uptake load of the lithium extractors 204 and 206 to target or minimize the level of one or more impurities in the clean stream 134. The controller 124 may similarly control the concentrator 138 to accomplish impurity removal downstream of the second lithium extractor 206. In the lithium recovery system 200, impurities may circulate between and among the lithium extractors 204 and 206, and the impurity removal unit 132 may remove them to the water recovery process 107 for return to the environment. When the composition sensor 137 detects changing impurity levels, the controller 124 may be configured to perform a hierarchy of control actions (including intensifying impurity removal at the impurity removal unit 132), for example by increasing addition of alkalinity to increase the pH at the impurity removal unit 132, increasing flow of eluent 108 to reduce solution concentration of impurities entering the impurity removal unit 132, and intensifying permeation of the concentrator 138 to increase impurity removal into the recycled streams. Depending on the nature of the impurities detected by the composition sensor 137, the controller 124 may be further configured to control the pretreat unit 105 to increase or decrease intensity of impurity removal upstream of the first lithium extractor 204.

Figure 3:
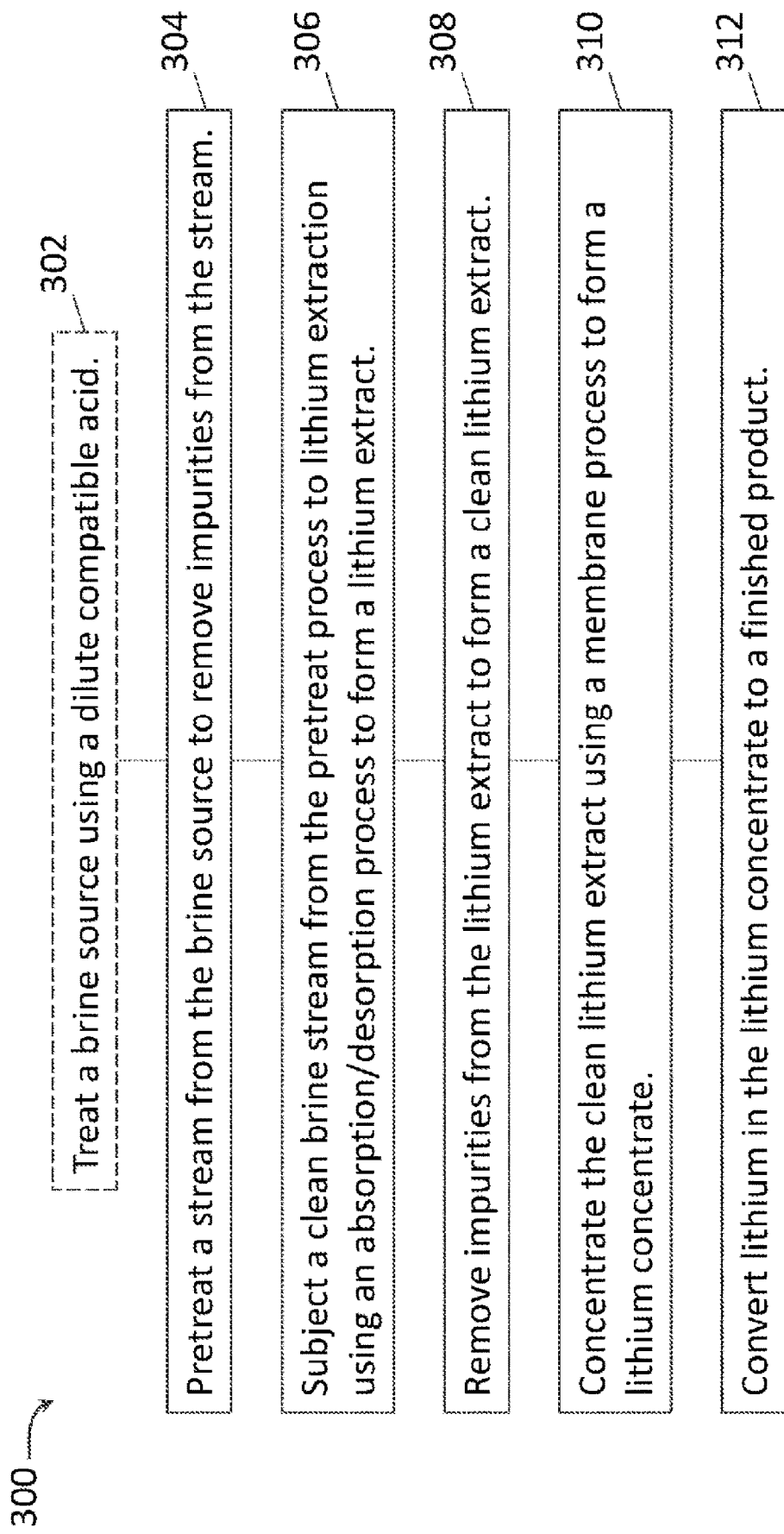
FIG. 3 is a flow-chart diagram of at least a portion of an example implementation of a method according to one or more aspects of the present disclosure.

FIG. 3 is a flow diagram showing at least a portion of a method 300 of lithium recovery performed by at least one of the lithium recovery systems 100 and 200. The method 300 recovers lithium from a brine source that contains lithium, along with metal impurities, such as Fe, SiO2, Ca, Mg, Mn, Al, and P, and solids, such as salts and soil that may be entrained in the brine source. The method 300 may include, at 302, optionally treating the brine source itself with a dilute compatible acid, such as hydrochloric acid, acetic acid, or citric acid, to lower the pH of the brine source. The acid treat operation is shown in FIG. 3 with a dotted outline to identify it as an optional part of the method 300. Lowering the pH of the brine source, for example to a range of about 5.5 to 7.0, may increase concentration of lithium in the brine source by removing some impurities from solution. Inserting the acid treatment at a location of the brine source remote from intake to a lithium recovery system may increase lithium in solution toward the intake by encouraging dissolution of lithium away from the acid injection location.

At 304, a feed may be taken from the brine source into a lithium recovery system. The feed may be pretreated to remove some impurities prior to lithium recovery. The pretreatment may include a more intensive acid treatment than that optionally applied to the brine source itself. The acid treatment may lower the pH further, for example to a range of about 5.0 to 6.5 or below, to remove iron from the brine source. The pretreatment may also include an ion exchange treatment to remove Si from the brine source. The impurities may be collected in an impurity stream that may be routed to disposition, for example by purification and return to the environment.

At 306, the cleaned brine from the pretreatment may be routed to a lithium extraction process. The lithium extraction process may use a sorption medium selective for lithium, which may be a resin known in the art, to absorb lithium from the cleaned brine. The medium, loaded with lithium, may then be washed using an eluent that may be a water stream or a lithium containing stream to unload the lithium into the eluent, forming a lithium extract stream. After exposure to the sorption medium, the cleaned brine becomes a lithium-depleted brine. Water may be recovered from the lithium-depleted brine and used to reduce demand for fresh water in the process. The water recovery process may produce a concentrated brine that may be routed to disposal, for example to purification for return to the environment.

The lithium sorption process may be batch, semi-batch, or continuous mode. In batch mode, a batch of absorbent may be exposed to the clean brine and loaded with lithium. When the absorbent reaches an end point, exposure to the clean brine may be discontinued, and exposure to the eluent stream may begin. The eluent stream removes lithium until a minimum point is reached, at which time exposure to the clean brine stream may resume. In semi-batch mode, a first batch of absorbent may be exposed to the clean brine stream while a second batch may be exposed to the eluent stream. When the two batches of absorbent reach their end points, exposure may be switched such that the first batch is then exposed to eluent while the second batch is exposed to the clean brine stream. Because the two exposures might take different lengths of time, there may be more batches of absorbent in sorption mode than in unloading mode, or vice versa. A controller may also vary cycle time to optimize modality of absorbent batches, for example by adjusting brine flow rate during loading and adjusting eluent flow rate, or eluent lithium content, during unloading. In continuous mode, sorption medium may be continuously flowed through and into contact with clean brine until the medium is loaded. For example, the solid sorption medium may be transported in a vessel, cage structure, or on a moving platform or belt through an exposure chamber or vessel, or to a flow path for exposure to a continuously circulating clean brine stream, and when fully loaded, may then be transported into another chamber, vessel, or flow path for exposure to eluent.

The lithium extraction process may be performed in stages, where a first lithium extraction stage produces an intermediate lithium extract, which may be routed to a second lithium extraction stage. In some cases, a third lithium extraction stage, or even more lithium extraction stages may be used. For each stage, the lithium-depleted stream may be routed to a prior stage as eluent. Water may be added to each eluent stream to target a salinity, or other compositional component. In this way, while lithium flows from stage to stage, at optionally increasing concentration, impurities that may be present are generally flowed "backward" from downstream stages to upstream stages to be routed to disposal, for example returned to the environment. The stages may thus be considered "counter-current" when operated in this manner.

In the two-stage case where a first lithium extraction stage produces an intermediate lithium extract which may be routed to a second lithium extraction stage, the first lithium extraction stage produces a first lithium-depleted stream while the second lithium extraction stage produces a second lithium-depleted stream. In one example, the second lithium-depleted stream may be about 10% the volume of the brine feed to the first lithium extraction stage. In this case, the second lithium-depleted stream may be routed to the first lithium extraction stage as an eluent stream. Some of the impurities in the second lithium-depleted stream may transfer to the first lithium-depleted stream by sorption onto the medium in the first lithium extraction stage, or from brine not entirely flushed from the medium when switching from loading to unloading mode. To prevent impurities from building up in recycle between the first and second lithium extraction stages, a portion of the second lithium-depleted stream may be routed to water recovery 107 or to disposal. As noted above, in a two-stage extraction, the second lithium extraction stage may have lower capacity, using less eluent flow than the first lithium extraction stage. In one example, eluent volume flow to the second lithium extraction stage may be 5% of the brine feed volume to the first lithium extraction stage.

The lithium extraction processes described herein, transfer of impurities to effluent intermediate product streams may be improved by preceding lithium unloading with a flush, evacuation, or other removal of the fluid in which the sorption medium may be immersed prior to flowing eluent across the sorption medium to unload lithium. In one example, the brine engaged with the medium may be displaced, using water or a lithium containing stream, such as one or more of those described above that may be used as, or with, the eluent stream. The fluid used to displace the brine may be routed to disposal, or when the fluid contains some lithium removed from the absorbent, and is otherwise compatible with the lithium recovery system (as will be the case with most aqueous flush fluids), may be returned to the feed of a lithium extraction stage or process. In another example, a fluid that does not remove lithium from the absorbent, such as an oleaginous fluid, for example a hydrocarbon fluid or other organic fluid, may be used to displace the brine. The oleaginous fluid may then be displaced with eluent and lithium unloading may commence. In another example, a gas, for example an inert gas like nitrogen or a noble gas, may be used to displace the brine. The gas may then be displaced by eluent and lithium unloading may commence. These displacement processes may be automated under the control of a controller in communication with suitably placed control devices.

The lithium extract, or an intermediate lithium extract, may be subjected to impurity removal at 308. While the sorption medium used in the lithium extraction process may be selective to lithium, some impurities may still pass through to the lithium extract streams. Those impurities may be removed, or mostly removed, in the impurity removal process. One aspect of the impurity removal process may be removal of divalent metal ions, such as Ca and Mg. Alkalinity may be added to raise the pH of the stream, for example to about 8 or 9, which precipitates Ca and Mg ions as salts. The precipitates may be removed in a slurry stream, which may be returned to a more neutral pH (which redissolves the Ca and Mg) and purified for return to the environment. The impurity removal may be performed between lithium extraction stages for a multi-stage lithium extraction process. The impurity removal process results in a clean lithium extract. In other embodiments, an ion exchange process using, for example, one of the IX ion exchange resins from DuPont de Nemours, Inc., of Wilmington, Del., may be used to remove divalent species. Such processes may avoid precipitation of the impurities for removal and then re-dissolve them for release to the environment.

At 310, the clean lithium extract may be concentrated using a membrane process. Pressure and temperature of the clean lithium extract may be brought to a target to facilitate maximum separation of water and lithium to increase solution concentration of lithium in the rejected stream. The permeate stream will contain some lithium and most remaining impurities. This permeate stream may be used, potentially along with other streams like water and other lithium-containing streams, as eluent for lithium extraction stages and processes described above. The rejected stream may be a clean lithium concentrate stream ready for finishing. Concentration using a membrane process may be useful here to remove water that otherwise would be removed by evaporation. At some concentration ranges, membrane separation may be more energy-efficient than evaporation for removing water and concentrating lithium-containing streams.

At 312, the clean lithium concentrate stream may be converted to lithium carbonate and/or lithium hydroxide. As described above, and according to known processes, sodium carbonate may be added to the lithium concentrate stream to convert the lithium chloride in the lithium concentrate stream to lithium carbonate and sodium chloride, and calcium hydroxide may be added to convert the lithium carbonate to lithium hydroxide hydrate. Water may be evaporated as part of the conversion process, and the evaporated water may be captured for reuse elsewhere in the process, for example in the various eluent streams for lithium extraction. The use of water evaporated in the conversion process may reduce the use of fresh water from the water source. Heat may be recovered from the evaporated water and re-used in the evaporation process and/or for other purposes, such as freeze protection and temperature set point targeting throughout the process. Heat may also be recovered from power generation that may be co-located with one or more of the lithium recovery systems described herein. Finally, recovered heat may be used to heat the brine source 102 and the eluent stream 108 for lithium extraction processing.

Figure 4:
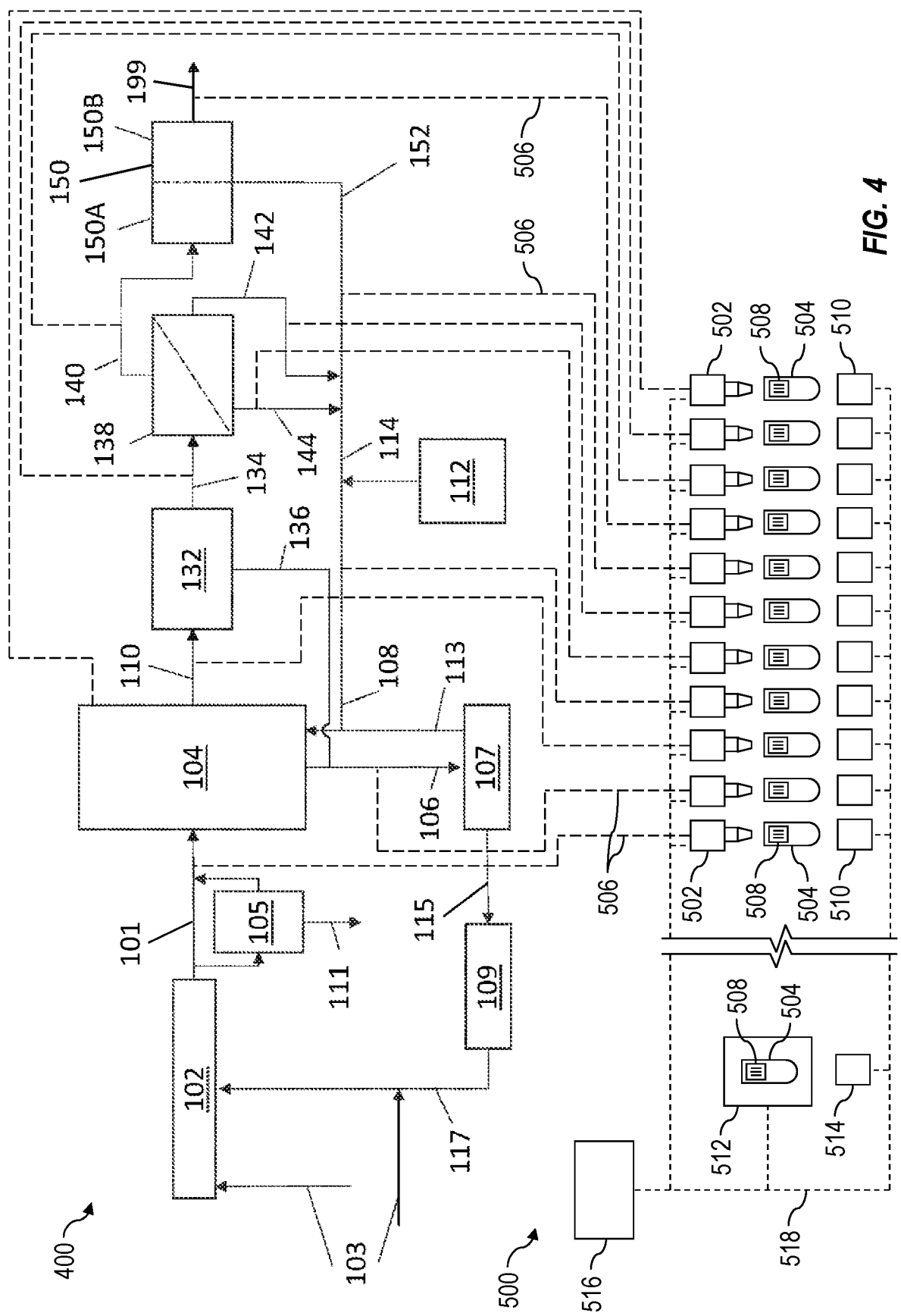
FIG. 4 is a schematic view of at least a portion of an example implementation of apparatus according to one or more aspects of the present disclosure.

FIG. 4 is a schematic view of at least a portion of an example implementation of a sampling system 500 for sampling and testing samples of a process fluid from a lithium recovery system 400 and associating the process sensor data and the process test data of the process fluid samples according to one or more aspects of the present disclosure. The lithium recovery system 400 therefore represents an example environment in which the sampling system 500 may be implemented. The lithium recovery system 400 may comprise one or more features and/or modes of operation of the lithium recovery system 100 shown in FIG. 1 and/or the lithium recovery system 200 shown in FIG. 2, including where indicated by the same reference numerals. Accordingly, the following description refers to FIGS. 1, 2, and 4, collectively.

The sampling system 500 may comprise a plurality of sample dispensers (or sample dispensing units or stations) 502 each operable to receive a different process fluid of the lithium recovery system 400 and then dispense a sample (i.e., a predetermined volume or quantity) of the process fluid into a corresponding sample container 504. The sampling system 500 may thus further comprise a plurality of fluid conduits 506 each fluidly connecting an instance of the sample dispensers 502 with a different source of a process fluid, such as a different portion of the lithium recovery system 400. Each fluid conduit 506 may thus be configured to deliver a different process fluid from a corresponding process fluid source of the lithium recovery system 400 to each sample dispenser 502, which may then dispense a sample of the process fluid to a corresponding instance of the sample containers 504 disposed in association with that sample dispenser 502. The sample dispensers 502 may be located adjacent or near (e.g., within the same room or area) the lithium recovery system 400 or the sample dispensers 502 may be at a remote location (e.g., a different room or building) from the lithium recovery system 400.

Each sample dispenser 502 may be fluidly connected via a corresponding fluid conduit 506 with a different process device (e.g., the brine source 102, the lithium extractor 104, the pretreat unit 105, the impurity removal unit 132, the concentrator 138, the conversion process 150, etc.) of the lithium recovery system 400, thereby permitting recovery and testing of a process fluid received or output by such process device. Each sample dispenser 502 may also or instead be fluidly connected via a corresponding fluid conduit 506 with a different process fluid conduit (e.g., the lithium-containing brine stream 101, lithium-depleted brine stream 106, the lithium extract stream 110, the water stream 113, the lithium-containing stream 114, the clean lithium extract stream 134, the impurity stream 136, the lithium concentrate stream 140, the water permeate stream 142, the sweep effluent stream 144, the water stream 152, the lithium hydroxide product 199, etc.) of the lithium recovery system 400, thereby permitting recovery and testing of process fluids being transferred between the process devices via such fluid conduits. Each fluid conduit 506 may comprise a fluid port (e.g., a fluid tap, a fluid connector, etc.) connected with a different process fluid source (e.g., a different process device or a different process fluid conduit) of the lithium recovery system 400 and configured to divert some of the process fluid from the process fluid source to a corresponding sample dispenser 502.

The sampling system 500 may further comprise a plurality of identification tags 508 each associated with a corresponding sample container 504 and a plurality of dispenser identification tag readers 510 each associated with a corresponding sample dispenser 502. Each dispenser identification tag reader 510 may be operable to read the identification tag 508 at the point of sampling when a sample container 504 is disposed in association with a sample dispenser 502 to receive a process fluid sample. For example, each dispenser identification tag reader 510 may be operable to read the identification tag 508 associated with the sample container 504 disposed in association with the sample dispenser 502 associated with that dispenser identification tag reader 510. The dispenser identification tag reader 510 may then output dispenser identification tag data indicative of that identification tag 508. Each identification tag 508 may be or comprise a bar code, a quick response (QR) code, and/or other pictorial and/or alphanumeric identifier that can be scanned or otherwise read by a corresponding dispenser identification tag reader 510 when a sample container 504 is disposed underneath or otherwise in association with a corresponding sample dispenser 502. Each identification tag 508 may instead be or comprise a radio-frequency identification (RFID) chip that can be scanned or otherwise read by a corresponding dispenser identification tag reader 510 when a sample container 504 is disposed underneath or otherwise in association with a corresponding sample dispenser 502.

The sampling system 500 may further comprise a process fluid sample tester 512 operable to test (or analyze) a process fluid sample within a sample container 504 to determine one or more properties (or characteristics) of the process fluid sample. The sample tester 512 may then output sample test data indicative of the one or more properties of the process fluid sample. The sample tester 512 may be or comprise a sample analyzer (e.g., a mass spectrometer, a capillary electrophoreses analyzer, etc.) operable to detect properties (e.g., physical composition, physical properties, chemical properties, chemical composition, etc.) of the process fluid sample. The sample tester 512 may be a first instance of a plurality of sample testers 512 (just one shown), each operable to detect the same and/or a different property of the process fluid sample. The sampling system 500 may further comprise a tester identification tag reader 514 associated with the (or each) sample tester 512. The tester identification tag reader 514 may be operable to read the identification tag 508 associated with the sample container 504 containing the process fluid sample that is intended to be tested (or is being tested) by the sample tester 512 and output tester identification tag data indicative of that identification tag 508. The sample tester 512 and the tester identification tag reader 514 may be located adjacent or near (e.g., within the same room) the sample dispensers 502 or the sample tester 512 and the tester identification tag reader 514 may be at a remote location (e.g., a different room or building) from the sample dispensers 502.

The sampling system 500 may further comprise a processing device 516 (e.g., a computer) comprising a processor and a computer program code that, when executed by the processer, may perform and/or cause performance of example methods, processes, and/or operations described herein. The processing device 516 may be communicatively connected with different devices of the sampling system 500 via a communication means 518, such as may permit the processing device 516 to receive sensor data (e.g., sensor measurements, feedback, etc.) from the devices and output control data (i.e., control commands) to the devices to cause such devices to perform the example methods and/or operations described herein. The communication means 518 may be or comprise a wired and/or wireless communication means, both of which are within the scope of the present disclosure.

The processing device 516 may be operable to output control data to one or more of the sample dispensers 502 to cause the sample dispensers 502 to flush a corresponding fluid conduit 506 to discharge (or purge) stagnant process fluid from the fluid conduit 506, such that a sample of the process fluid is representative of current process conditions at the process fluid source. The processing device 516 may be further operable to output control data to one or more of the sample dispensers 502 to cause one or more of the sample dispensers 502 to dispense a sample of the process fluid into a corresponding sample container 504. The processing device 516 may be still further operable to receive sensor data from one or more of the sample dispensers 502 to monitor operational status (e.g., open, closed, etc.) of one or more of the sample dispensers 502. For example, the processing device 516 may be communicatively connected with each sample dispenser 502 via the communication means 518 configured to transmit the sensor data and/or the control data between the processing device 516 and each sample dispenser 502.

The processing device 516 may be further operable to receive the dispenser identification tag data output by each dispenser identification tag reader 510. The processing device 516 may be communicatively connected with each dispenser identification tag reader 510 via the communication means 518 configured to transmit the dispenser identification tag data from each dispenser identification tag reader 510 to the processing device 516.

Although not shown in FIG. 4 for clarity and ease of understanding, the lithium recovery system 400 may further comprise a plurality of process sensors operable to output process sensor data indicative of properties of various process fluids at different process fluid sources of the lithium recovery system 400 at different stages of the lithium recovery process. Example properties of the process fluids may include location of the process fluid source (e.g., location of a fluid port of a fluid conduit 506), time a process fluid sample has been taken, flow rate of the process fluid, temperature of the process fluid, and pressure of the process fluid. Such properties of the process fluids may provide context for the process fluid, wherein such contextual information may then be used to further analyze and evaluate the process fluid sample. The process sensors of the lithium recovery system 400 may be or comprise the sensors 116, 118, 120, 122, 126, 137, 139, 141, 143, 151, 198 of the lithium recovery systems 100, 200 shown in FIGS. 1 and 2.

The processing device 516 may be further operable to receive the process sensor data output by the process sensors of the lithium recovery system 400 indicative of properties of various process fluids at different process fluid sources of the lithium recovery system 400. The processing device 516 may be communicatively connected directly with each process sensor via the communication means 518 configured to transmit the process sensor data from each process sensor to the processing device 516. The processing device 516 may also or instead be communicatively connected indirectly with each process sensor via the controller 124, shown in FIGS. 1 and 2, and the communication means 518 configured to transmit the process sensor data from the controller 124 to the processing device 516. While or after the processing device 516 receives the dispenser identification tag data (i.e., while or after the identification tag 508 is read by a dispenser identification tag reader 510), the processing device 516 may be operable to associate (or record in association with each other) the dispenser identification tag data output by each dispenser identification tag reader 510 with the process sensor data indicative of the properties of the process fluid at an instance of the process fluid sources corresponding to an instance of the sample dispensers 502 associated with that dispenser identification tag reader 510. The processing device 516 and/or the dispenser identification tag reader 510 may also output process sensor data indicative of the process fluid source of the process fluid sample and/or time the process fluid sample has been dispensed into (or collected by) the sample container 504.

The processing device 516 may be further operable to receive the tester identification tag data output by the tester identification tag reader 514. The processing device 516 may be communicatively connected with the tester identification tag reader 514 via the communication means 518 configured to transmit the tester identification tag data from the tester identification tag reader 514 to the processing device 516. The processing device 516 may be further operable to receive the sample test data output by the sample tester 512. The sample test data may be input manually into the processing device 516 by human personnel (e.g., a lab technician). The sample test data output by the sample tester 512 may instead be automatically transmitted to the processing device 516. For example, the processing device 516 may be communicatively connected with the sample tester 512 via the communication means 518 configured to transmit the sample test data from the sample tester 512 to processing device 516.

While or after the processing device 516 receives the tester identification tag data and the sample test data, the processing device 516 may be operable to associate (or record in association with each other) the tester identification tag data output by the tester identification tag reader 514 with the sample test data output by the sample tester 512. The processing device 516 may then compare the tester identification tag data output by the tester identification tag reader 514 to the dispenser identification tag data output by each dispenser identification tag reader 510 and associate (or record in association with each other) the sample test data with the process sensor data associated with the dispenser identification tag data that matches the tester identification tag data. Thus, for the dispenser identification tag data and the tester identification tag data that match, the processing device 516 may associate (or record in association with each other) the sample test data and the process sensor data associated with the matching dispenser identification tag data and the tester identification tag data. The process sensor data may provide to the sample test data contextual information (e.g., process insights) that may be used to further analyze and evaluate the sample test data. Association (or consolidation) of the process sensor data from the time of sampling and the sample test data output by the sample tester 512 may be performed on a local memory of the processing device 516 or on a remote memory (e.g., a cloud database).

Figure 5:
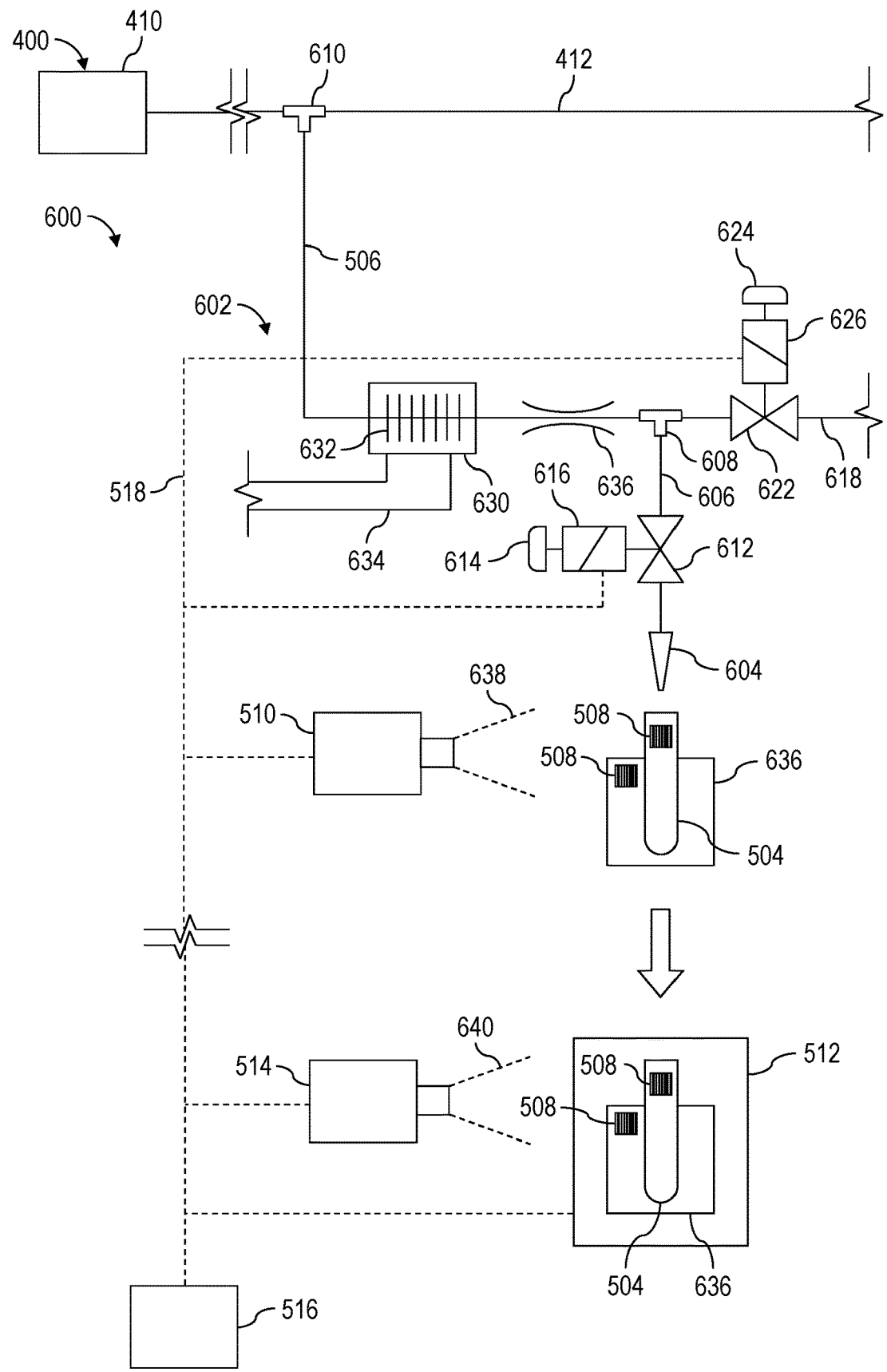
FIG. 5 is a schematic view of at least a portion of an example implementation of apparatus according to one or more aspects of the present disclosure.

FIG. 5 is a schematic view of at least a portion of an example implementation of a sampling system 600 for sampling and testing samples of a process fluid from a lithium recovery system 400 and associating the process sensor data and the process test data of the process fluid samples according to one or more aspects of the present disclosure. The sampling system 600 may be an example implementation of and comprise one or more features and/or modes of operation of the sampling system 500 shown in FIG. 4, including where indicated by the same reference numerals. Accordingly, the following description refers to FIGS. 4 and 5, collectively.

The sampling system 600 may comprise a plurality of sample dispensers 602 (or sample dispensing units or stations) (just one shown), each operable to receive a different process fluid of the lithium recovery system 400 and then dispense a sample of the process fluid into a corresponding sample container 504. Each dispenser 602 may comprise a fluid nozzle 604 and at least a portion of a first fluid path extending between a process fluid source of the lithium recovery system 400 and the fluid nozzle 604 and configured to transfer a process fluid sample from the process fluid source to the fluid nozzle 604. The first fluid path may comprise at least a portion of the fluid conduit 506 extending between the dispenser 602 and a fluid port 610 fluidly connected to the process fluid source. The fluid port 610 may be configured to divert some of the process fluid from the process fluid source into the first fluid path to be transferred to the sample dispenser 602. The process fluid source of the lithium recovery system 400 may be or comprise a process device 410, such as the lithium extractor 104 shown in FIGS. 1 and 2. The process fluid source of the lithium recovery system 400 may also or instead be or comprise a process fluid conduit 412, such as an aqueous fluid stream 101 containing lithium to be received by the lithium extractor 104, a lithium extract stream 110 output by the lithium extractor 104, or a lithium-depleted stream 106 output by the lithium extractor 104, which are also shown in FIGS. 1 and 2. The first fluid path may further comprise a fluid conduit 606 and various fluid connectors and devices fluidly connected between the fluid conduit 506 and the fluid nozzle 604.

Each dispenser 602 may further comprise a fluid control device 612 along the first fluid path. The fluid control device 612 may be operable between a closed position in which the fluid control device 612 prevents transfer of the process fluid sample through the first fluid path to the fluid nozzle 604 and an open position in which the fluid control device 612 permits transfer of the process fluid sample through the first fluid path to the fluid nozzle 604 and into a sample container 504 disposed in association with (e.g., below) the fluid nozzle 604. The fluid control device 612 may comprise a manual operator 614 (e.g., a knob, a handle, a lever, etc.) that can be manually operated (e.g., turned, rotated, etc.) by a human operator (e.g., a lab technician) to operate (or move) the fluid control device 612 between the closed position and the open position. The fluid control device 612 may also or instead be configured for remote operation. For example, the fluid control device 612 may comprise a remote operator 616 (e.g., a magnetic coil, a pneumatic cylinder or other actuator, an electric motor or other actuator, etc.) that can be remotely operated (e.g., turned on, turned off, etc.) by a control device (e.g., a computer) or by human operator using a control workstation (e.g., a human machine interface (HMI)) to operate (or move) the fluid control device 612 between the closed position and the open position.

Each dispenser 602 may further comprise a second fluid path connected to the first fluid path, such as via a fluid connector 608 (e.g., a tee connector). The second fluid path may extend between at least a portion of the first fluid path and a fluid disposal destination (not shown), such as a collection tank, fluid reconditioning (e.g., cleaning or filtration) equipment, or a predetermined process stream (or line) of the lithium recovery system 400. The second fluid path may permit stagnant process fluid within the first fluid path to be flushed out of the first fluid path via the second fluid path to the fluid disposal destination before the process fluid sample is transferred through the first fluid path into the sample container 504. The second fluid path may comprise a fluid conduit 618 and various fluid connectors and devices fluidly connected between the first fluid path (or the fluid connector 608) and the fluid disposal destination.

Each dispenser 602 may further comprise another fluid control device 622 along the second fluid path. The fluid control device 622 may be operable between a closed position in which the fluid control device 622 fluidly disconnects the second fluid path from the first fluid path and an open position in which the fluid control device 622 fluidly connects the second fluid path to the first fluid path, thereby permitting the stagnant process fluid within the first fluid path to flow through the second fluid path to flush out the stagnant process fluid within the first fluid path before the process fluid sample is transferred through the first fluid path into the sample container 504 disposed in association with (e.g., below) the fluid nozzle 604. The fluid control device 622 may comprise a manual operator 624 (e.g., a knob, a handle, a lever, etc.) that can be manually operated (e.g., turned, rotated, etc.) by a human operator (e.g., a lab technician) to operate (or move) the fluid control device 622 between the closed position and the open position. The fluid control device 622 may also or instead be configured for remote operation. For example, the fluid control device 622 may comprise a remote operator 626 (e.g., a magnetic coil, a pneumatic cylinder or other actuator, an electric motor or other actuator, etc.) that can be remotely operated (e.g., turned on, turned off, etc.) by a control device (e.g., a computer) or by the human operator using a control workstation (e.g., an HMI) to operate (or move) the fluid control device 622 between the closed position and the open position.

Each dispenser 602 may further comprise a cooling device 630 (e.g., a chiller) along the first fluid path and operable to reduce temperature of the process fluid sample being transferred along the first fluid path, such that the process fluid sample within the sample container 504 is safe to manually handle by the human operator. The cooling device 630 may comprise a plurality of heat dissipating members 632 (e.g., fins, coils, etc.) connected along the first fluid path. The cooling device 630 may be fluidly connected with a source of coolant (not shown) via fluid conduits 634 configured to transfer the coolant into and out of the cooling device 630.

Each dispenser 602 may further comprise a flow rate control device 636 along the first fluid path and operable to control flow rate of the process fluid sample being transferred along the first fluid path into the sample container 504, such as to ensure that the flow rate of the process fluid is constant and repeatable (e.g., to facilitate fluid metering). The flow rate control device 636 may be or comprise a restriction orifice configured to reduce the flow rate of the process fluid sample being transferred along the first fluid path. The flow rate control device 636 may be an adjustable flow rate control device (e.g., a needle valve) configured for manual operation by a human operator to adjust the flow rate of the process fluid sample being transferred along the first fluid path.

The sampling system 600 may further comprise a plurality of identification tag readers 510 (just one shown), each associated with a corresponding sample dispenser 602 and operable to read an identification tag 508 associated with (e.g., carried by) the sample container 504 disposed in association with the fluid nozzle 604 of that sample dispenser 602 and located within a field of view 638 (or scanning area) of the identification tag reader 510. Each identification tag reader 510 may be operable to read an identification tag 508 associated with a carrying container 636 (e.g., a tray) for carrying the sample container 504. Each identification tag reader 510 may be further operable to output dispenser identification tag data indicative of the identification tag 508.

The sampling system 600 may further comprise one or more sample testers 512, each operable to test (or analyze) the process fluid sample within the sample container 504 and output sample test data indicative of a property of the process fluid sample. The sampling system 600 may further comprise a tester identification tag reader 514 associated with the (or each) sample tester 512. The tester identification tag reader 514 may be operable to read the identification tag 508 associated with the sample container 504 containing the process fluid sample that is intended to be tested (or is being tested) by the sample tester 512 (or the identification tag 508 associated with the container 636) and located within a field of view 640 (or scanning area) of the tester identification tag reader 514. The tester identification tag reader 514 may then output tester identification tag data indicative of the identification tag 508.

The sampling system 600 may further comprise a processing device 516 (e.g., a computer) communicatively connected with different devices of the sampling system 600 via a communication means 518, such as may permit the processing device 516 to receive sensor data (e.g., sensor measurements, feedback, etc.) from the devices and output control data (i.e., control commands) to the devices to cause such devices to perform the example methods and/or operations described herein. For example, the processing device 516 may be communicatively connected with the fluid control devices 612, 622 and operable to cause the fluid control devices 612, 622 to operate between the open position and the closed position. Thus, the processing device 516 may output control data to the remote operator 626 to cause the fluid control device 622 to open to flush out (e.g., purge or discharge) stagnant process fluid from the first fluid path via the second fluid path. After sufficient volume of the process fluid has been flushed out of the first fluid path, the processing device 516 may output control data to the remote operator 626 to cause the fluid control device 622 to close and output control data to the remote operator 616 to cause the fluid control device 612 to open for a predetermined period of time to dispense a predetermined volume of the process fluid into the sample container 504.

The processing device 516 may be further operable to receive the dispenser identification tag data output by each dispenser identification tag reader 510. The processing device 516 may be further operable to receive the process sensor data output by the process sensors of the lithium recovery system 400 indicative of properties of various process fluids at different process fluid sources of the lithium recovery system 400. While or after the processing device 516 receives the dispenser identification tag data (i.e., while or after the identification tag 508 is read by a dispenser identification tag reader 510), the processing device 516 may be operable to associate (or record in association with each other) the dispenser identification tag data output by each dispenser identification tag reader 510 with the process sensor data indicative of the properties of the process fluid at the process fluid source corresponding to the sample dispenser 602 associated with that dispenser identification tag reader 510.

The processing device 516 may be further operable to receive the tester identification tag data output by the tester identification tag reader 514. The processing device 516 may be further operable to receive the sample test data output by the sample tester 512. While or after the processing device 516 receives the tester identification tag data and the sample test data, the processing device 516 may be operable to associate (or record in association with each other) the tester identification tag data output by the tester identification tag reader 514 with the sample test data output by the sample tester 512. The processing device 516 may then compare the tester identification tag data output by the tester identification tag reader 514 to the dispenser identification tag data output by each dispenser identification tag reader 510 and associate (or record in association with each other) the sample test data with the process sensor data associated with the dispenser identification tag data that matches the tester identification tag data. Thus, for the dispenser identification tag data and the tester identification tag data that match, the processing device 516 may associate (or record in association with each other) the sample test data and the process sensor data associated with the matching dispenser identification tag data and the tester identification tag data.

Figure 6:
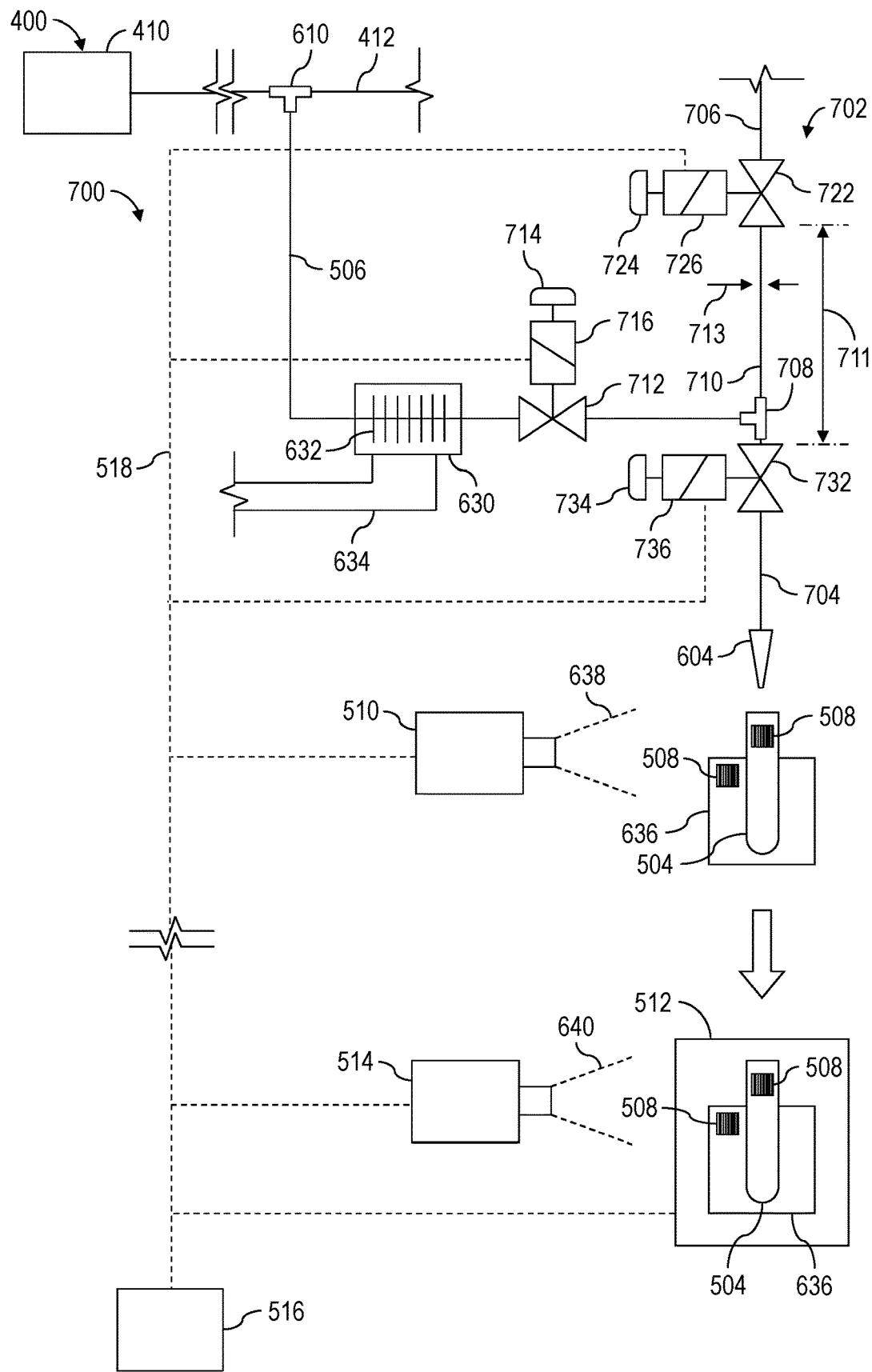
FIG. 6 is a schematic view of at least a portion of an example implementation of apparatus according to one or more aspects of the present disclosure.

FIG. 6 is a schematic view of at least a portion of an example implementation of a sampling system 700 for sampling and testing samples of a process fluid from a lithium recovery system 400 and associating the process sensor data and the process test data of the process fluid samples according to one or more aspects of the present disclosure. The sampling system 700 may be an example implementation of and comprise one or more features and/or modes of operation of the sampling system 500 shown in FIG. 4 and the sampling system 600 shown in FIG. 5, including where indicated by the same reference numerals. Accordingly, the following description refers to FIGS. 4-6, collectively.

The sampling system 700 may comprise a plurality of sample dispensers 702 (sample dispensing units or stations) (just one shown), each operable to receive a different process fluid of the lithium recovery system 400 and then dispense (or discharge) a sample of the process fluid into a corresponding sample container 504. Each dispenser 702 may comprise at least a portion of a first fluid path fluidly connected to a process fluid source of the lithium recovery system 400 and configured to transfer the process fluid from the process fluid source, a second fluid path fluidly connected with the first fluid path and configured to transfer the process fluid from the first fluid path to flush the first fluid path, and at least a portion of a third fluid path fluidly connected with the first fluid path and the second fluid path and configured to transfer the process fluid sample into the sample container 504 disposed in association with a fluid nozzle 604 at an end of the third fluid path. The first fluid path, the second fluid path, and the third fluid path may be fluidly connected at a fluid junction 708 (e.g., a tee fluid connector).

The first fluid path may comprise at least a portion of a fluid conduit 506 extending between the dispenser 702 and a fluid port 610 fluidly connected to the process fluid source. The fluid port 610 may be configured to divert some of the process fluid from the process fluid source into the first fluid path to be transferred to the sample dispenser 702. The process fluid source of the lithium recovery system 400 may be or comprise a process device 410 and/or a process fluid conduit 412. The first fluid path may extend between the process fluid source of the lithium recovery system 400 and the fluid junction 708 and further comprise various fluid connectors and devices fluidly connected between the process fluid source and the fluid junction 708. Each dispenser 702 may further comprise a cooling device 630 (e.g., a chiller) along the first fluid path and operable to reduce temperature of the process fluid sample being transferred along the first fluid path. The second fluid path may extend between the fluid junction 708 and a fluid disposal destination (not shown), such as a collection tank, fluid reconditioning (e.g., cleaning or filtration) equipment, or a predetermined process stream (or line) of the lithium recovery system 400. The second fluid path may permit stagnant process fluid within the first fluid path to be flushed out of the first fluid path via the second fluid path to the fluid disposal destination before the process fluid sample is transferred through the first fluid path into the sample container 504. The second fluid path may comprise a fluid conduit 706 and various fluid connectors and devices fluidly connected between the fluid junction 708 (or the first fluid path) and the fluid disposal destination. The third fluid path may comprise the fluid nozzle 604, a fluid conduit 704 extending between the fluid junction 708 and the fluid nozzle 604, and various fluid connectors and devices fluidly connected between the fluid junction 708 and the fluid nozzle 604. The third fluid path may be configured to transfer the process fluid into the sample container 504.

Each sample dispenser 702 may further comprise a first fluid control device 712 along the first fluid path, a second fluid control device 722 along the second fluid path, and a third fluid control device 732 along the third fluid path. A portion of the second fluid path may define a fluid chamber 710 having (or defining) a known predetermined volume for containing a sample (i.e., a predetermined volume or amount) of the process fluid. The volume of the fluid chamber 710 may be selected based on an intended volume of the process fluid sample that is intended to be dispensed into the sample container 504. The volume of the fluid chamber 710 may be defined by a length (or height) 711 and a width (or inside diameter) 713 of a portion of the second fluid path (e.g., the fluid conduit 706) extending between the fluid control device 722 and the fluid control device 732. The fluid chamber 710 may thus define a volume of the sample of the process fluid, which is to be dispensed into the sample container 504. Although the first fluid control device 712 and the fluid junction 708 are shown separated by and fluidly connected by a portion of the fluid conduit 506, the first fluid control device 712 and the fluid junction 708 may be disposed in close proximity (e.g., against or abutting each other) to eliminate or otherwise minimize volume of the process fluid located between the first fluid control device 712 and the fluid junction 708 that can flow out of the fluid conduit 506 and dispensed into the sample container 504 when the process fluid within the fluid chamber 710 is dispensed into the sample container 504. Each of the fluid control valves 712, 722, 732 may be or comprise a ball valve, a poppet valve, a diaphragm valve, or other flow shut-off valve.

When the process fluid from the process fluid source is a slurry containing solid particles, the sampling system 700 comprising the sample dispensers 702 may be used for sampling and testing samples of such process fluid, as the sample dispensers 702 can be less susceptible to being clogged by the solid particles suspended in such process fluid then the sample dispensers 602 of the sampling system 600. For example, the sample dispensers 702 do not include the flow rate control valve 636 of the sample dispensers 602, which can be susceptible to being clogged by the solid particles of the slurry, which could restrict flow through the flow rate control valve 636 and, thus, cause inaccurate volumes of the slurry to be dispensed into the sample container 504. Furthermore, when the sampling system 700 is used for sampling and testing a slurry containing solid particles, each fluid control valve 712, 722, 732 may be implemented as a diaphragm valve. Diaphragm valves can be less susceptible to being clogged by the solid particles of the slurry.

The fluid control device 712 may be operable between a closed position in which the first fluid control device 712 fluidly disconnects the first fluid path from the second fluid path and the third fluid path and an open position in which the first fluid control device fluidly connects the first fluid path with the second fluid path and the third fluid path. The fluid control device 712 may comprise a manual operator 714 (e.g., a knob, a handle, a lever, etc.) that can be manually operated (e.g., turned, rotated, etc.) by a human operator (e.g., a lab technician) to operate (or move) the fluid control device 712 between the closed position and the open position. The fluid control device 712 may also or instead be configured for remote operation. For example, the fluid control device 712 may comprise a remote operator 716 (e.g., a magnetic coil, a pneumatic cylinder or other actuator, an electric motor or other actuator, etc.) that can be remotely operated (e.g., turned on, turned off, etc.) by a control device (e.g., a computer) or by human operator using a control workstation (e.g., an HMI) to operate (or move) the fluid control device 712 between the closed position and the open position.

The fluid control device 722 may be operable between a closed position in which the fluid control device 722 fluidly disconnects the fluid chamber 710 from rest of the second fluid path and an open position in which the fluid control device 722 fluidly connects the fluid chamber 710 with the rest of the second fluid path. The fluid control device 722 may comprise a manual operator 724 (e.g., a knob, a handle, a lever, etc.) that can be manually operated (e.g., turned, rotated, etc.) by a human operator (e.g., a lab technician) to operate (or move) the fluid control device 722 between the closed position and the open position. The fluid control device 722 may also or instead be configured for remote operation. For example, the fluid control device 722 may comprise a remote operator 726 (e.g., a magnetic coil, a pneumatic cylinder or other actuator, an electric motor or other actuator, etc.) that can be remotely operated (e.g., turned on, turned off, etc.) by a control device (e.g., a computer) or by human operator using a control workstation (e.g., an HMI) to operate (or move) the fluid control device 722 between the closed position and the open position.

The fluid control device 732 may be operable between a closed position in which the fluid control device 732 fluidly disconnects the third fluid path from the fluid chamber 710 and an open position in which the third fluid control device 732 fluidly connects the third fluid path with the fluid chamber 710. Thus, the fluid control device 732 may be operable between a closed position in which the fluid control device 732 prevents transfer of the process fluid sample from the fluid chamber 710 along the third fluid path to the fluid nozzle 604 and an open position in which the fluid control device 732 permits transfer of the process fluid sample from the fluid chamber 710 through the second fluid path to the fluid nozzle 604 and into a sample container 504 disposed in association with (e.g., below) the fluid nozzle 604. The fluid control device 732 may comprise a manual operator 734 (e.g., a knob, a handle, a lever, etc.) that can be manually operated (e.g., turned, rotated, etc.) by a human operator (e.g., a lab technician) to operate (or move) the fluid control device 732 between the closed position and the open position. The fluid control device 732 may also or instead be configured for remote operation. For example, the fluid control device 732 may comprise a remote operator 736 (e.g., a magnetic coil, a pneumatic cylinder or other actuator, an electric motor or other actuator, etc.) that can be remotely operated (e.g., turned on, turned off, etc.) by a control device (e.g., a computer) or by human operator using a control workstation (e.g., an HMI) to operate (or move) the fluid control device 732 between the closed position and the open position.

The sampling system 700 may further comprise a plurality of identification tag readers 510 (just one shown), each associated with a corresponding sample dispenser 702 and operable to read an identification tag 508 associated with (e.g., carried by) the sample container 504 disposed in association with the fluid nozzle 604 of that sample dispenser 702 and located within a field of view 638 (or scanning area) of the identification tag reader 510. Each identification tag reader 510 may be operable to read an identification tag 508 associated with a carrying container 636 (e.g., a tray) for carrying the sample container 504. Each identification tag reader 510 may be further operable to output dispenser identification tag data indicative of the identification tag 508.

The sampling system 700 may further comprise one or more sample testers 512, each operable to test (or analyze) the process fluid sample within the sample container 504 and output sample test data indicative of a property of the process fluid sample. The sampling system 700 may further comprise a tester identification tag reader 514 associated with the (or each) sample tester 512. The tester identification tag reader 514 may be operable to read the identification tag 508 associated with the sample container 504 containing the process fluid sample that is intended to be tested (or is being tested) by the sample tester 512 (or the identification tag 508 associated with the container 636) and located within a field of view 640 (or scanning area) of the tester identification tag reader 514. The tester identification tag reader 514 may then output tester identification tag data indicative of the identification tag 508.

The sampling system 700 may further comprise a processing device 516 (e.g., a computer) communicatively connected with different devices of the sampling system 700 via a communication means 518, such as may permit the processing device 516 to receive sensor data (e.g., sensor measurements, feedback, etc.) from the devices and output control data (i.e., control commands) to the devices to cause such devices to perform the example methods and/or operations described herein. For example, the processing device 516 may be communicatively connected with the fluid control devices 712, 722, 732 and operable to cause the fluid control devices 712, 722, 732 to operate between the open position and the closed position. Thus, the processing device 516 may output control data to the remote operators 716, 726 to cause the fluid control devices 712, 722 to open to flush out (e.g., purge or discharge) stagnant process fluid from the first fluid path via the second fluid path. After sufficient volume of the process fluid has been flushed out of the first fluid path, the processing device 516 may output control data to the remote operators 716, 726 to cause the fluid control devices 712, 722 to close and output control data to the remote operator 736 to cause the fluid control device 732 to open to permit the process fluid sample within the fluid chamber 710 to flow out of the fluid chamber 710 (e.g., via gravity) to dispense the process fluid sample having a predetermined volume into the sample container 504. Thus, when the fluid control valve 712 and the fluid control valve 722 are in the open positions and the fluid control valve 732 is in the closed position, the process fluid is permitted to flow through the first fluid path and the second fluid path to flush the first fluid path and to fill the fluid chamber 710 with the process fluid sample. Furthermore, when the fluid control valve 712 and the fluid control valve 722 are in the closed positions and the fluid control valve 732 is in the open position, the process fluid is prevented from flowing through the first fluid path and the second fluid path and the process fluid sample is permitted to flow from the fluid chamber 710 through the third path into the sample container 504.

The processing device 516 may be further operable to receive the dispenser identification tag data output by each dispenser identification tag reader 510. The processing device 516 may be further operable to receive the process sensor data output by the process sensors of the lithium recovery system 400 indicative of properties of various process fluids at different process fluid sources of the lithium recovery system 400. While or after the processing device 516 receives the dispenser identification tag data (i.e., while or after the identification tag 508 is read by a dispenser identification tag reader 510), the processing device 516 may be operable to associate (or record in association with each other) the dispenser identification tag data output by each dispenser identification tag reader 510 with the process sensor data indicative of the properties of the process fluid at the process fluid source corresponding to the sample dispenser 702 associated with that dispenser identification tag reader 510.

The processing device 516 may be further operable to receive the tester identification tag data output by the tester identification tag reader 514. The processing device 516 may be further operable to receive the sample test data output by the sample tester 512. While or after the processing device 516 receives the tester identification tag data and the sample test data, the processing device 516 may be operable to associate (or record in association with each other) the tester identification tag data output by the tester identification tag reader 514 with the sample test data output by the sample tester 512. The processing device 516 may then compare the tester identification tag data output by the tester identification tag reader 514 to the dispenser identification tag data output by each dispenser identification tag reader 510 and associate (or record in association with each other) the sample test data with the process sensor data associated with the dispenser identification tag data that matches the tester identification tag data. Thus, for the dispenser identification tag data and the tester identification tag data that match, the processing device 516 may associate (or record in association with each other) the sample test data and the process sensor data associated with the matching dispenser identification tag data and the tester identification tag data.

Figure 7:
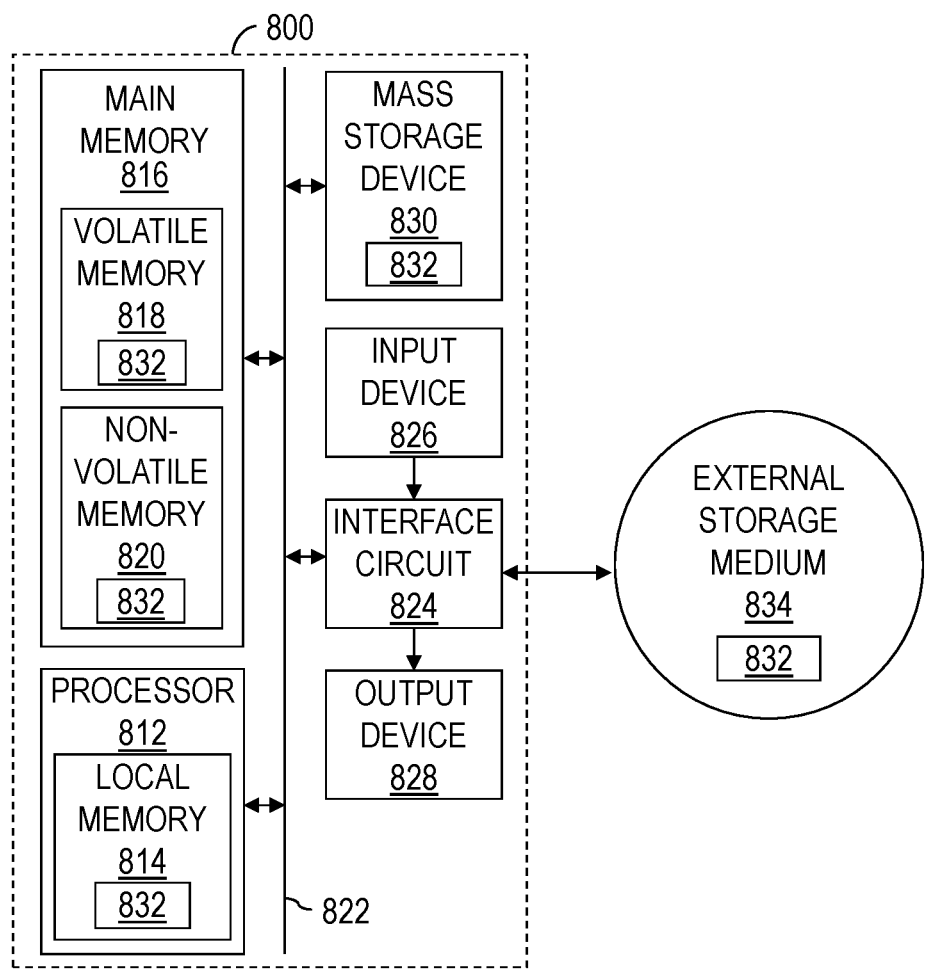
FIG. 7 is a schematic view of at least a portion of an example implementation of apparatus according to one or more aspects of the present disclosure.

FIG. 7 is a schematic view of at least a portion of an example implementation of a processing device (or system) 800 according to one or more aspects of the present disclosure. The processing device 800 may be or form at least a portion of one or more equipment controllers and/or other electronic devices shown in one or more of the FIGS. 1-6. For example, the processing device 800 may be or form at least a portion of one or more of the controller 124, the identification tag readers 510, 514, the sample tester 512, and the processing device 516. Accordingly, the following description refers to FIGS. 1-7, collectively.

The processing device 800 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. Although it is possible that the entirety of the processing device 800 is implemented within one device, it is also contemplated that one or more components or functions of the processing device 800 may be implemented across multiple devices.

The processing device 800 may comprise a processor 812, such as a general-purpose programmable processor. The processor 812 may comprise a local memory 814, and may execute machine-readable and executable program code instructions 832 (i.e., computer program code) present in the local memory 814 and/or other memory device. The processor 812 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 812 include one or more INTEL microprocessors, microcontrollers from the ARM and/or PICO families of microcontrollers, embedded soft/hard processors in one or more FPGAs.

The processor 812 may execute, among other things, the program code instructions 832 and/or other instructions and/or programs to implement the example methods and/or operations described herein. For example, the program code instructions 832, when executed by the processor 812 of the processing device 800, may cause the processor 812 to receive and process (e.g., compare, analyze, etc.) sensor data (e.g., sensor measurements). The program code instructions 832, when executed by the processor 812 of the processing device 800, may also or instead output control data (i.e., control commands) to cause one or more portions or pieces of the lithium recovery systems 100, 200, 400 and/or the sampling systems 500, 600, 700 to perform the example methods and/or operations described herein. The program code instructions 832, when executed by the processor 812 of the processing device 800, may also or instead output information indicative of an event (e.g., abnormal event), a status (e.g., operational state, operational position, operational health, etc.), or a characteristic (e.g., size, length, height, etc.) of an object (e.g., a valve), a piece of equipment, or otherwise forming a portion of the lithium recovery systems 100, 200, 400 and/or the sampling systems 500, 600, 700 an output device (e.g., a control workstation) for viewing by human personnel.

The processor 812 may be in communication with a main memory 816, such as may include a volatile memory 818 and a non-volatile memory 820, perhaps via a bus 822 and/or other communication means. The volatile memory 818 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 820 may be, comprise, or be implemented by read-only memory, flash memory, and/or other types of memory devices. One or more memory controllers (not shown) may control access to the volatile memory 818 and/or non-volatile memory 820.

The processing device 800 may also comprise an interface circuit 824, which is in communication with the processor 812, such as via the bus 822. The interface circuit 824 may be, comprise, or be implemented by various types of standard interfaces, such as an Ethernet interface, a universal serial bus (USB), a third-generation input/output (3GIO) interface, a wireless interface, a cellular interface, and/or a satellite interface, among others. The interface circuit 824 may comprise a graphics driver card. The interface circuit 824 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 800 may be in communication with various sensors, video cameras, actuators, processing devices, equipment controllers, and other devices of the lithium recovery systems 100, 200, 400 and/or the sampling systems 500, 600, 700 via the interface circuit 824. The interface circuit 824 can facilitate communications between the processing device 800 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or other communication protocol.

One or more input devices 826 may also be connected to the interface circuit 824. The input devices 826 may permit a human user to enter the program code instructions 832, which may be or comprise control data, operational parameters, and/or operational set-points. The program code instructions 832 may further comprise modeling or predictive routines, equations, algorithms, processes, applications, and/or other programs operable to perform example methods and/or operations described herein. The input devices 826 may be, comprise, or be implemented by a keyboard, a mouse, a joystick, a touchscreen, a trackpad, a trackball, an isopoint, and/or a voice recognition system, among other examples. One or more output devices 828 may also be connected to the interface circuit 824. The output devices 828 may permit visualization or other sensory perception of various data, such as sensor data, status data, and/or other example data. The output devices 828 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 826 and the one or more output devices 828 connected to the interface circuit 824 may, at least in part, facilitate the HMIs described herein.

The processing device 800 may comprise a mass storage device 830 for storing data and program code instructions 832. The mass storage device 830 may be connected to the processor 812, such as via the bus 822. The mass storage device 830 may be or comprise a tangible, non-transitory storage medium, such as a floppy disk drive, a hard disk drive, a compact disk (CD) drive, and/or digital versatile disk (DVD) drive, among other examples. The processing device 800 may be communicatively connected with an external storage medium 834 via the interface circuit 824. The external storage medium 834 may be or comprise a removable storage medium (e.g., a CD or DVD), such as may be operable to store data and program code instructions 832.

As described above, the program code instructions 832 may be stored in the mass storage device 830, the main memory 816, the local memory 814, and/or the removable storage medium 834. Thus, the processing device 800 may be implemented in accordance with hardware (perhaps implemented in one or more chips including an integrated circuit, such as an ASIC), or may be implemented as software or firmware for execution by the processor 812. In the case of firmware or software, the implementation may be provided as a computer program product including a non-transitory, computer-readable medium or storage structure embodying computer program code instructions 832 (i.e., software or firmware) thereon for execution by the processor 812. The program code instructions 832 may include program instructions or computer program code that, when executed by the processor 812, may perform and/or cause performance of example methods, processes, and/or operations described herein.

Figure 8:
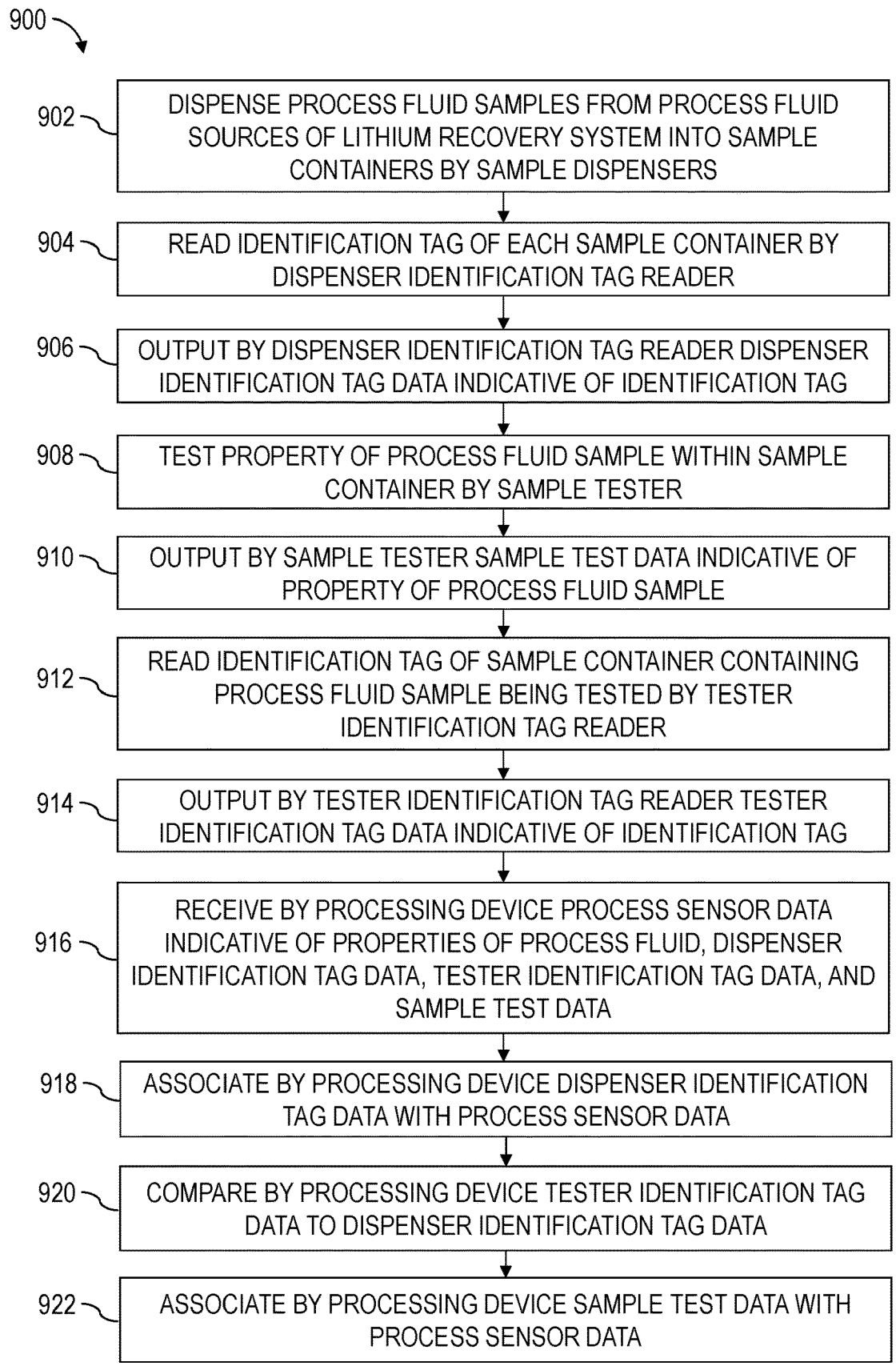
FIG. 8 is a flow-chart diagram of at least a portion of an example implementation of a method according to one or more aspects of the present disclosure.

FIG. 8 is a flow-chart diagram of at least a portion of an example method 900 (e.g., operation and/or process) for sampling and testing samples of a process fluid from a lithium recovery system 400 and associating the process sensor data and the process test data of the process fluid samples according to one or more aspects of the present disclosure. The method 900 may be performed by utilizing (or otherwise in conjunction with) at least a portion of one or more implementations of one or more instances of the apparatus shown in one or more of FIGS. 1-7, and/or otherwise within the scope of the present disclosure. The method 900 may be caused to be performed, at least partially, by a processing device (e.g., the processing device 516, 800) executing computer program code according to one or more aspects of the present disclosure. The method 900 may also or instead be caused to be performed, at least partially, by a human user (e.g., a lab technician) utilizing one or more instances of the apparatus shown in one or more of FIGS. 1-7, and/or otherwise within the scope of the present disclosure. Thus, the following description of example methods refers to apparatus shown in one or more of FIGS. 1-7. However, the methods may also be performed in conjunction with implementations of apparatus other than those depicted in FIGS. 1-7 that are also within the scope of the present disclosure.

The method 900 may comprise dispensing 902 a plurality of process fluid samples from a plurality of process fluid sources of a lithium recovery system 400 for recovering lithium from an aqueous fluid containing lithium into a plurality of sample containers 504 by a plurality of sample dispensers 502 each fluidly connected to corresponding instance of the process fluid sources. Each sample container 504 may carry a corresponding identification tag 508.

The method 900 may further comprise reading 904 the identification tag 508 of each sample container 504 by an instance of a plurality of dispenser identification tag readers 510 each associated with a corresponding sample dispenser 502, and outputting 906 by each dispenser identification tag reader 510 dispenser identification tag data indicative of the identification tag being read by that dispenser identification tag reader 510.

The method 900 may further comprise testing 908 a property of the process fluid sample within an instance of the sample containers 504 by a sample tester 512, and outputting 910 by the sample tester 512 sample test data indicative of the property of the process fluid sample being tested, reading 912 the identification tag 508 of the sample container 504 containing the process fluid sample being tested by a tester identification tag reader 514, and outputting 914 by the tester identification tag reader 514 tester identification tag data indicative of the identification tag 508 being read by the tester identification tag reader 514.

The method 900 may further comprise receiving 916 by a processing device 516: process sensor data indicative of properties of a process fluid at each process fluid source of the lithium recovery system 400; the dispenser identification tag data output by each instance of the dispenser identification tag readers 510; the tester identification tag data output by the tester identification tag reader 514; and the sample test data output by the sample tester 512.

The method 900 may further comprise associating 918 by the processing device 516 the dispenser identification tag data output by each instance of the dispenser identification tag readers 510 with the process sensor data indicative of the properties of the process fluid at an instance of the process fluid sources corresponding to an instance of the sample dispensers 502 associated with that dispenser identification tag reader 510, comparing 920 by the processing device 516 the tester identification tag data output by the tester identification tag reader 514 to the dispenser identification tag data output by each instance of the dispenser identification tag readers 510, and associating 922 by the processing device 516 the sample test data with the process sensor data associated with the dispenser identification tag data that matches the tester identification tag data.

The present disclosure introduces a system that includes a lithium recovery system and sensors each operable to output a sensor data indicative of a property of a process fluid at a process fluid source of the lithium recovery system. The system also includes sample dispensers, fluid conduits each fluidly connecting an instance of the sample dispensers and a corresponding process fluid source, and sample containers. Each sample dispenser is operable to dispense a process fluid sample from a corresponding process fluid source into an instance of the sample containers disposed in association with that sample dispenser. The system also includes identification tags, each associated with a corresponding instance of the sample containers, and dispenser identification tag readers each associated with a corresponding instance of the sample dispensers. Each dispenser identification tag reader is operable to: read the identification tag associated with an instance of the sample containers disposed in association with the sample dispenser associated with that dispenser identification tag reader; and output dispenser identification tag data indicative of that identification tag. The system also includes a sample tester operable to: determine a property of the process fluid sample within an instance of the sample containers; and output sample test data indicative of the property of the process fluid sample. The system also includes a tester identification tag reader associated with the sample tester and operable to: read the identification tag associated with an instance of the sample containers containing the process fluid sample that is intended to be tested by the sample tester; and output tester identification tag data indicative of that identification tag. The system also includes a processing device operable to: receive the sensor data output by each sensor; receive the dispenser identification tag data output by each dispenser identification tag reader; associate the dispenser identification tag data output by each dispenser identification tag reader with the sensor data indicative of the properties of the process fluid at an instance of the process fluid sources corresponding to an instance of the sample dispensers associated with that dispenser identification tag reader; receive the tester identification tag data output by the tester identification tag reader; receive the sample test data output by the sample tester; compare the tester identification tag data output by the tester identification tag reader to the dispenser identification tag data output by each dispenser identification tag reader; and associate the sample test data with the sensor data associated with the dispenser identification tag data that matches the tester identification tag data.

The process fluid sources of the lithium recovery system may comprise at least one of: an aqueous fluid containing lithium to be received by a lithium extractor; a lithium extract stream output by the lithium extractor; and a lithium-depleted stream output by the lithium extractor.

The present disclosure also introduces a method that includes dispensing, by sample dispensers, process fluid samples of process fluids from process fluid sources of a lithium recovery system into sample containers. Each instance of the process fluid sources is associated with a corresponding instance of the sample dispensers. Each instance of the sample containers carries a corresponding identification tag. Each instance of dispenser identification tag readers reads an instance of the identification tags carried by a corresponding instance of the sample containers. Each instance of the dispenser identification tag readers is associated with a corresponding instance of the sample dispensers and thus associated with a corresponding instance of the process fluid sources. Each instance of the dispenser identification tag readers outputs dispenser identification tag data indicative of the identification tag being read by that instance of the dispenser identification tag readers. A sample tester tests each instance of the process fluid samples to determine a property of each instance of the process fluid samples. The sample tester outputs a sample test data indicative of the property of each instance of the process fluid samples. A tester identification tag reader reads each identification tag. The tester identification tag reader outputs a tester identification tag data indicative of each identification tag. Each of multiple sensors outputs sensor data indicative of a property of an instance of the process fluids. Each instance of the sensors is associated with a corresponding instance of the process fluid sources. A processing device associates each instance of the sensor data with a corresponding instance of the dispenser identification tag data. The instance of the sensors outputting the instance of the sensor data and the instance of the dispenser identification tag readers outputting the corresponding instance of the dispenser identification tag data are associated with the same instance of the process fluid sources. The processing device compares each instance of the tester identification tag data output by the tester identification tag reader to each instance of the dispenser identification tag data output by each instance of the dispenser identification tag readers. For each instance of the tester identification tag data and each instance of the dispenser identification tag data that match, the processing device associates each instance of the sample test data with a corresponding instance of the sensor data.

The method may further comprise receiving by the processing device: the sensor data; the dispenser identification tag data; the tester identification tag data; and the sample test data.

The process fluid sources of the lithium recovery system may comprise at least one of: an aqueous fluid containing lithium to be received by a lithium extractor; a lithium extract stream output by the lithium extractor; and a lithium-depleted stream output by the lithium extractor.

The present disclosure also introduces a system that includes a fluid sampling system including a fluid nozzle, a fluid path that transfers a process fluid sample of a process fluid from a process fluid source of a lithium recovery system to the fluid nozzle, and a fluid control device along the fluid path. The fluid control device is operable between a closed position, in which the fluid control device prevents transfer of the process fluid sample through the fluid path to the fluid nozzle, and an open position, in which the fluid control device permits transfer of the process fluid sample through the fluid path to the fluid nozzle and into a sample container disposed in association with the fluid nozzle. The system also includes an identification tag reader operable to: read an identification tag associated with the sample container disposed in association with the fluid nozzle; and output dispenser identification tag data indicative of the identification tag. The system also includes a processing device operable to: receive process sensor data indicative of properties of the process fluid at the process fluid source of the lithium recovery system; receive the dispenser identification tag data output by the dispenser identification tag reader; and associate the dispenser identification tag data with the process sensor data.

The fluid path may be a first fluid path, the fluid control device may be a first fluid control device, and the system may further comprise: a second fluid path connected to the first fluid path; and a second fluid control device along the second fluid path. The second fluid control device may be operable between a closed position, in which the second fluid control device fluidly disconnects the second fluid path from the first fluid path, and an open position, in which the second fluid control device fluidly connects the second fluid path with the first fluid path thereby permitting the process fluid within the first fluid path to flow through the second fluid path to flush out the process fluid within the first fluid path before the process fluid sample is transferred through the first fluid path into the sample container.

The system may comprise a cooling device along the fluid path operable to reduce the temperature of the process fluid sample being transferred along the fluid path.

The system may comprise a flow rate control device along the fluid path and operable to control flow rate of the process fluid sample being transferred along the fluid path.

The fluid control device may be configured for remote operation, the fluid control device may be communicatively connected with the processing device, and the processing device may be operable to cause the fluid control device to operate between the open position and the closed position.

The process fluid source of the lithium recovery system may comprise at least one of: an aqueous fluid containing lithium to be received by a lithium extractor; a lithium extract stream output by the lithium extractor; and a lithium-depleted stream output by the lithium extractor.

The present disclosure also introduces a system that includes a fluid sampling system including a first fluid path fluidly connected to a process fluid source of a lithium recovery system, a second fluid path fluidly connected with the first fluid path, a third fluid path fluidly connected with the first fluid and second fluid paths, a first fluid control device along the first fluid path, a second fluid control device along the second fluid path, and a third fluid control device along the third fluid path. The first fluid path transfers a process fluid from the process fluid source. The third fluid path transfers the process fluid into a sample container disposed in association with an end of the third fluid path. The first fluid control device is operable between a closed position, in which the first fluid control device prevents flow of the process fluid through the first fluid path, and an open position, in which the first fluid control device permits flow of the process fluid through the first fluid path. The second fluid control device is operable between a closed position, in which the second fluid control device prevents flow of the process fluid through the second fluid path, and an open position, in which the second fluid control device permits flow of the process fluid through the second fluid path. The third fluid control device is operable between a closed position, in which the third fluid control device prevents flow of the process fluid through the third fluid path, and an open position, in which the third fluid control device permits flow of the process fluid through the third fluid path. A portion of the second and/or third fluid path extending between the second and third fluid control devices define a fluid chamber having a predetermined volume for containing a process fluid sample of the process fluid. When the first and second fluid control valves are in the open positions and the third fluid control valve is in the closed position, the process fluid is permitted to flow through the first and second fluid paths to fill the fluid chamber with the process fluid sample and the process fluid is prevented from flowing through the third path into the sample container. When the first and second fluid control valves are in the closed positions and the third fluid control valve is in the open position, the process fluid is prevented from flowing through the first fluid path and the process fluid sample is permitted to flow from the fluid chamber through the third path into the sample container.

When the first and second fluid control valves are in the open positions and the third fluid control valve is in the closed position, the process fluid may be permitted to flow through the first and second fluid paths to also flush out the process fluid within the first fluid and the portion of the second fluid path defining the chamber before the fluid chamber is filled with the process fluid sample.

The system may comprise a cooling device along the fluid path and operable to reduce the temperature of the process fluid sample being transferred along the fluid path.

The first, second, and third fluid control devices may each be configured for remote operation and may each be communicatively connected with a processing device. The processing device may be operable to cause each of the first, second, and third fluid control devices to operate between the open and closed positions.

The system may comprise an identification tag reader and a processing device. The identification tag reader may be operable to: read an identification tag associated with the sample container disposed in association with an end of the third fluid path; and output dispenser identification tag data indicative of the identification tag. The processing device may be operable to: receive process sensor data indicative of properties of the process fluid at the process fluid source of the lithium recovery system; receive the dispenser identification tag data output by the dispenser identification tag reader; and associate the dispenser identification tag data with the process sensor data.

The process fluid source of the lithium recovery system may comprise at least one of: an aqueous fluid containing lithium to be received by a lithium extractor; a lithium extract stream output by the lithium extractor; and a lithium-depleted stream output by the lithium extractor.

The first, second, and third fluid paths may be fluidly connected at a fluid junction, the first fluid control device may be disposed along the first fluid path against the fluid junction, and the second fluid control device may be disposed along the second fluid path at a distance away from the fluid junction.

The first, second, and third fluid paths may be fluidly connected at a fluid junction, the first fluid control device may be disposed along the first fluid path against the fluid junction, the third fluid control device may be disposed along the third fluid path against the fluid junction, and the second fluid control device may be disposed along the second fluid path at a distance away from the fluid junction. The fluid junction may comprise a fluid tee connector.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A system comprising:
a lithium recovery system;
a plurality of sensors each operable to output a sensor data indicative of a property of a process fluid at a process fluid source of the lithium recovery system;
a plurality of sample dispensers;
a plurality of fluid conduits each fluidly connecting an instance of the sample dispensers and a corresponding process fluid source;
a plurality of sample containers, wherein each sample dispenser is operable to dispense a process fluid sample from a corresponding process fluid source into an instance of the sample containers disposed in association with that sample dispenser;
a plurality of identification tags each associated with a corresponding instance of the sample containers;
a plurality of dispenser identification tag readers each associated with a corresponding instance of the sample dispensers, wherein each dispenser identification tag reader is operable to:
read the identification tag associated with an instance of the sample containers disposed in association with the sample dispenser associated with that dispenser identification tag reader; and
output dispenser identification tag data indicative of that identification tag;
a sample tester operable to:
determine a property of the process fluid sample within an instance of the sample containers; and
output sample test data indicative of the property of the process fluid sample;
a tester identification tag reader associated with the sample tester, wherein the tester identification tag reader is operable to:
read the identification tag associated with an instance of the sample containers containing the process fluid sample that is intended to be tested by the sample tester; and
output tester identification tag data indicative of that identification tag; and
a processing device operable to:
receive the sensor data output by each sensor;
receive the dispenser identification tag data output by each dispenser identification tag reader;
associate the dispenser identification tag data output by each dispenser identification tag reader with the sensor data indicative of the properties of the process fluid at an instance of the process fluid sources corresponding to an instance of the sample dispensers associated with that dispenser identification tag reader;
receive the tester identification tag data output by the tester identification tag reader;
receive the sample test data output by the sample tester;
compare the tester identification tag data output by the tester identification tag reader to the dispenser identification tag data output by each dispenser identification tag reader; and
associate the sample test data with the sensor data associated with the dispenser identification tag data that matches the tester identification tag data.

2. The system of claim 1 wherein the process fluid sources of the lithium recovery system comprise at least one of:
an aqueous fluid containing lithium to be received by a lithium extractor;
a lithium extract stream output by a lithium extractor; and
a lithium-depleted stream output by a lithium extractor.

3. A method comprising:
dispensing by a plurality of sample dispensers a plurality of process fluid samples of a plurality of process fluids from a plurality of process fluid sources of a lithium recovery system into a plurality of sample containers, wherein each instance of the process fluid sources is associated with a corresponding instance of the sample dispensers, and wherein each instance of the sample containers carries a corresponding identification tag;
reading by each instance of a plurality of dispenser identification tag readers an instance of the identification tags carried by a corresponding instance of the sample containers, wherein each instance of the dispenser identification tag readers is associated with a corresponding instance of the sample dispensers and thus associated with a corresponding instance of the process fluid sources;
outputting by each instance of the dispenser identification tag readers dispenser identification tag data indicative of the identification tag being read by that instance of the dispenser identification tag readers;
testing by a sample tester each instance of the process fluid samples to determine a property of each instance of the process fluid samples;
outputting by the sample tester a sample test data indicative of the property of each instance of the process fluid samples;
reading by a tester identification tag reader each identification tag;
outputting by the tester identification tag reader a tester identification tag data indicative of each identification tag;
outputting by each of a plurality of sensors a sensor data indicative of a property of an instance of the process fluids, wherein each instance of the sensors is associated with a corresponding instance of the process fluid sources;
associating by a processing device each instance of the sensor data with a corresponding instance of the dispenser identification tag data, wherein the instance of the sensors outputting the instance of the sensor data and the instance of the dispenser identification tag readers outputting the corresponding instance of the dispenser identification tag data are associated with the same instance of the process fluid sources;
comparing by the processing device each instance of the tester identification tag data output by the tester identification tag reader to each instance of the dispenser identification tag data output by each instance of the dispenser identification tag readers; and
for each instance of the tester identification tag data and each instance of the dispenser identification tag data that match, associating by the processing device each instance of the sample test data with a corresponding instance of the sensor data.

4. The method of claim 3 further comprising receiving by the processing device:
the sensor data;
the dispenser identification tag data;
the tester identification tag data; and
the sample test data.

5. The method of claim 3 wherein the process fluid sources of the lithium recovery system comprise at least one of:
an aqueous fluid containing lithium to be received by a lithium extractor;
a lithium extract stream output by a lithium extractor; and
a lithium-depleted stream output by a lithium extractor.

6. A system comprising:
a fluid sampling system comprising:
a fluid nozzle;
a fluid path configured to transfer a process fluid sample of a process fluid from a process fluid source of a lithium recovery system to the fluid nozzle;
a fluid control device along the fluid path, wherein the fluid control device is operable between a closed position in which the fluid control device prevents transfer of the process fluid sample through the fluid path to the fluid nozzle and an open position in which the fluid control device permits transfer of the process fluid sample through the fluid path to the fluid nozzle and into a sample container disposed in association with the fluid nozzle;
an identification tag reader operable to:
read an identification tag associated with the sample container disposed in association with the fluid nozzle; and
output dispenser identification tag data indicative of the identification tag;
a processing device operable to:
receive process sensor data indicative of properties of the process fluid at the process fluid source of the lithium recovery system;
receive the dispenser identification tag data output by the dispenser identification tag reader; and
associate the dispenser identification tag data with the process sensor data.

7. The system of claim 6 wherein:
the fluid path is a first fluid path;
the fluid control device is a first fluid control device; and
the system further comprises:
a second fluid path connected to the first fluid path; and
a second fluid control device along the second fluid path, wherein the second fluid control device is operable between a closed position in which the second fluid control device fluidly disconnects the second fluid path from the first fluid path and an open position in which the second fluid control device fluidly connects the second fluid path with the first fluid path thereby permitting the process fluid within the first fluid path to flow through the second fluid path to flush out the process fluid within the first fluid path before the process fluid sample is transferred through the first fluid path into the sample container.

8. The system of claim 6 further comprising a cooling device along the fluid path, wherein the cooling device is operable to reduce temperature of the process fluid sample being transferred along the fluid path.

9. The system of claim 6 further comprising a flow rate control device along the fluid path, wherein the flow rate control device is operable to control flow rate of the process fluid sample being transferred along the fluid path.

10. The system of claim 6 wherein:
the fluid control device is configured for remote operation;
the fluid control device is communicatively connected with the processing device; and
the processing device is operable to cause the fluid control device to operate between the open position and the closed position.

11. The system of claim 6 wherein the process fluid source of the lithium recovery system comprises at least one of:
an aqueous fluid containing lithium to be received by a lithium extractor;
a lithium extract stream output by a lithium extractor; and
a lithium-depleted stream output by a lithium extractor.

12. A system comprising:
a fluid sampling system comprising:
a first fluid path fluidly connected to a process fluid source of a lithium recovery system and configured to transfer a process fluid from the process fluid source;
a second fluid path fluidly connected with the first fluid path;
a third fluid path fluidly connected with the first fluid path and the second fluid path and configured to transfer the process fluid into a sample container disposed in association with an end of the third fluid path;
a first fluid control valve along the first fluid path and operable between a closed position in which the first fluid control valve prevents flow of the process fluid through the first fluid path and an open position in which the first fluid control valve permits flow of the process fluid through the first fluid path;
a second fluid control valve along the second fluid path and operable between a closed position in which the second fluid control valve prevents flow of the process fluid through the second fluid path and an open position in which the second fluid control valve permits flow of the process fluid through the second fluid path; and
a third fluid control valve along the third fluid path and operable between a closed position in which the third fluid control valve prevents flow of the process fluid through the third fluid path and an open position in which the third fluid control valve permits flow of the process fluid through the third fluid path, wherein:
a portion of the second fluid path and/or third fluid path extending between the second fluid control valve and the third fluid control valve defines a fluid chamber having a predetermined volume for containing a process fluid sample of the process fluid;
when the first fluid control valve and the second fluid control valve are in the open positions and the third fluid control valve is in the closed position, the process fluid is permitted to flow through the first fluid path and the second fluid path to fill the fluid chamber with the process fluid sample and the process fluid is prevented from flowing through the third path into the sample container; and
when the first fluid control valve and the second fluid control valve are in the closed positions and the third fluid control valve is in the open position, the process fluid is prevented from flowing through the first fluid path and the process fluid sample is permitted to flow from the fluid chamber through the third path into the sample container.

13. The system of claim 12 wherein when the first fluid control valve and the second fluid control valve are in the open positions and the third fluid control valve is in the closed position, the process fluid is permitted to flow through the first fluid path and the second fluid path to also flush out the process fluid within the first fluid path and the portion of the second fluid path defining the chamber before the fluid chamber is filled with the process fluid sample.

14. The system of claim 12 further comprising a cooling device along the first fluid path, wherein the cooling device is operable to reduce temperature of the process fluid sample being transferred along the first fluid path.

15. The system of claim 12 wherein:
the first fluid control valve, the second fluid control valve, and the third fluid control valve are each configured for remote operation;
the first fluid control valve, the second fluid control valve, and the third fluid control valve are each communicatively connected with a processing device; and
the processing device is operable to cause each of the first fluid control valve, the second fluid control valve, and the third fluid control valve to operate between the open position and the closed position.

16. The system of claim 12 further comprising:
an identification tag reader operable to:
read an identification tag associated with the sample container disposed in association with an end of the third fluid path; and
output dispenser identification tag data indicative of the identification tag; and a processing device operable to:
receive process sensor data indicative of properties of the process fluid at the process fluid source of the lithium recovery system;
receive the dispenser identification tag data output by the dispenser identification tag reader; and
associate the dispenser identification tag data with the process sensor data.

17. The system of claim 12 wherein the process fluid source of the lithium recovery system comprises at least one of:
an aqueous fluid containing lithium to be received by a lithium extractor;
a lithium extract stream output by a lithium extractor; and
a lithium-depleted stream output by a lithium extractor.

18. The system of claim 12 wherein:
the first fluid path, the second fluid path, and the third fluid path are fluidly connected at a fluid junction;
the first fluid control valve is disposed along the first fluid path against the fluid junction; and
the second fluid control valve is disposed along the second fluid path at a distance away from the fluid junction.

19. The system of claim 12 wherein:
the first fluid path, the second fluid path, and the third fluid path are fluidly connected at a fluid junction;
the first fluid control valve is disposed along the first fluid path against the fluid junction;
the third fluid control valve is disposed along the third fluid path against the fluid junction; and
the second fluid control valve is disposed along the second fluid path at a distance away from the fluid junction.

20. The system of claim 19 wherein the fluid junction comprises a fluid tee connector.

\* \* \* \* \*